(12) United States Patent
Akiyama

(10) Patent No.: US 6,278,553 B1
(45) Date of Patent: Aug. 21, 2001

(54) OPTICAL SYSTEM HAVING REFRACTIVE INDEX DISTRIBUTION

(75) Inventor: Takeshi Akiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/257,511

(22) Filed: Feb. 25, 1999

(30) Foreign Application Priority Data

Feb. 27, 1998 (JP) .................................................. 10-063981

(51) Int. Cl.$^7$ .................................................. G02B 27/10
(52) U.S. Cl. .................. 359/627; 359/563; 359/566; 359/707; 359/833
(58) Field of Search .................. 359/563, 566, 359/707, 833

(56) References Cited

U.S. PATENT DOCUMENTS

| | | | |
|---|---|---|---|
| 3,404,934 | * 10/1968 | Brachvogel | 359/504 |
| 3,674,334 | 7/1972 | Offner | 350/55 |
| 4,265,510 | 5/1981 | Cook | 350/55 |
| 4,479,697 | * 10/1984 | Kapany et al. | 350/96.18 |
| 4,737,021 | 4/1988 | Korsch | 350/505 |
| 4,775,217 | 10/1988 | Ellis | 350/538 |
| 5,004,328 | * 4/1991 | Suzuki et al. | 350/416 |
| 5,063,586 | 11/1991 | Jewell et al. | 378/34 |
| 5,134,526 | * 7/1992 | Inabata | 359/726 |
| 5,159,495 | * 10/1992 | Hamblen | 359/731 |
| 5,452,126 | * 9/1995 | Johnson | 359/407 |
| 5,475,489 | * 12/1995 | Gottsche | 356/364 |
| 5,516,473 | * 5/1996 | Bakeev et al. | 264/154 |
| 5,663,833 | * 9/1997 | Nanba et al. | 359/631 |
| 5,699,194 | * 12/1997 | Takahashi | 359/633 |
| 5,808,805 | * 9/1998 | Takahashi | 359/651 |

FOREIGN PATENT DOCUMENTS

| | | |
|---|---|---|
| 62-47826 | 3/1987 | (JP) . |
| 64-51335 | 2/1989 | (JP) . |
| 2-297516 | 12/1990 | (JP) . |
| 5-12704 | 1/1993 | (JP) . |
| 6-139612 | 5/1994 | (JP) . |
| 9-65246 | 3/1997 | (JP) . |

* cited by examiner

Primary Examiner—Georgia Epps
Assistant Examiner—Tim Thompson
(74) Attorney, Agent, or Firm—Fitzpatrick, Cella, Harper & Scinto

(57) ABSTRACT

An optical system and, more specifically, an image pick-up optical system having a small size and satisfactory aberration, in which an optical system includes an optical unit having a light incident surface on which light is incident, a light reflecting surface having a curvature to reflect the light incident from the light incident surface, and a light exit surface from which the light reflected by the light reflecting surface emerges, and has a refractive index distribution, is disclosed.

8 Claims, 15 Drawing Sheets

OPTICAL SYSTEM HAVING REFRACTIVE INDEX DISTRIBUTION

BACKGROUND OF THE INVENTION

1. Field of the Invention

The present invention relates to an optical element and an optical system using the same and, more particularly, to an optical system suitable for a silver halide camera, video camera, still video camera, or copying machine, which uses an optical element having a plurality of reflecting surfaces to form an object image on a predetermined plane and reduce the size of the entire optical system.

2. Related Background Art

Various photographing optical systems using the reflecting surfaces of concave mirrors or convex mirrors have been conventionally proposed. FIG. 13 is a schematic view of a so-called mirror optical system (reflecting optical system) comprising one concave mirror and one convex mirror.

In the mirror optical system shown in FIG. 13, an object light beam 124 coming from an object is reflected by a concave mirror 121, travels to the object side while being focused, and is reflected by a convex mirror 122, thereby forming an image on an image plane 123.

This mirror optical system is based on the arrangement of a so-called Cassegrain reflecting telescope. This system aims at shortening the total length of the optical system by deflecting the optical path of a telephoto lens system, which comprises refracting lenses and has a large total lens length, using two reflecting mirrors opposing each other.

For an object lens system of a telescope as well, a number of schemes for reducing the total length of the optical system using a plurality of reflecting mirrors are known in addition to the Cassegrain scheme for the same reason.

In this way, conventionally, a compact mirror optical system is obtained by using reflecting mirrors in place of photographing lenses with a large total lens length to efficiently deflect the optical path.

However, generally, in the mirror optical system such as a Cassegrain reflecting telescope, the object light beam is partially eclipsed by the convex mirror 122. This problem is posed because the convex mirror 122 is inserted in the path of the object light beam 124.

To solve this problem, a mirror optical system which prevents a portion of the optical system from blocking the path of the object light beam 124, i.e., separates a principal ray 126 of the light beam from an optical axis 125 by decentering reflecting mirrors has also been proposed.

FIG. 14 is a schematic view of a mirror optical system disclosed in an U.S. Pat. No. 3,674,334. This system solves the problem of eclipse by separating the principal ray of an object light beam from the optical axis. The mirror optical system shown in FIG. 14 comprises a concave mirror 131, a convex mirror 132, and a concave mirror 133 in the order the light beam passes through. These mirrors are originally rotationally symmetric with respect to an optical axis 134, as is indicated by alternate long and two-dashed lines in FIG. 14. A principal ray 136 of an object light beam 135 is separated from the optical axis 134 by using only a portion of the concave mirror 131 above the optical axis 134, only a portion of the convex mirror 132 below the optical axis 134, and only a portion of the concave mirror 133 below the optical axis 134, thereby constructing an optical system free from eclipse of the object light beam 135.

FIG. 15 is a schematic view of a mirror optical system disclosed in U.S. Pat. No. 5,063,586. In the mirror optical system shown in FIG. 15, the central axes of reflecting mirrors are decentered from the optical axis to separate the principal ray of an object light beam from the optical axis, thereby solving the above problem.

Referring to FIG. 15, an axis perpendicular to an object surface 141 is defined as an optical axis 147. The central coordinates and central axes (a central axis is formed by connecting the center of a reflecting surface to the center of curvature of the surface) 142A, 143A, 144A, and 145A of the reflecting surfaces of a convex mirror 142, a concave mirror 143, a convex mirror 144, and a concave mirror 145, which are located in the order the light beam passes through, are decentered from the optical axis 147. In FIG. 15, by appropriately setting the decentering amounts and radii of curvature of the surfaces, the reflecting mirrors are prevented from eclipsing an object light beam 148, so an object image is efficiently formed on an imaging plane 146.

U.S. Pat. Nos. 4,737,021 or 4,265,510 also discloses an arrangement for avoiding eclipse partially using reflecting mirrors rotationally symmetric with respect to the optical axis or an arrangement for avoiding eclipse by decentering the central axes of reflecting mirrors from the optical axis.

As described above, when the reflecting mirrors constituting the mirror optical system are decentered, eclipse of the object light beam can be prevented. However, the reflecting mirrors must be set with different decentering amounts. This complicates the structure to which the reflecting mirrors are attached and also makes it difficult to ensure given attachment precision.

To solve this problem, a method of avoiding assembly errors of optical components in an assembly by forming the mirror system as one block has been proposed.

Conventionally, as a structure in which a number of reflecting surfaces form one block, there is an optical prism such as a pentagonal roof prism or Porro prism used in the viewfinder system of a camera, or an optical prism such as a color separation prism for separating a light beam from a photographing lens into, e.g., three color light components: red, green, and blue light components, and forming an object image based on each color light component on the surface of a corresponding image sensing element.

In these prisms, a plurality of reflecting surfaces are integrally formed, and have a precise relative positional relationship, so position adjustment of the reflecting surfaces is unnecessary. However, the main function of these prisms is to change the direction the light beam travels to invert the image, and each reflecting surface is flat.

On the other hand, an optical system using a prism whose reflecting surface has a curvature is also known.

FIG. 16 is a schematic view of an observation optical system disclosed in U.S. Pat. No. 4,775,217. This observation optical system observes the landscape and simultaneously observes an image displayed on an information display device overlapping the landscape.

In this observation optical system, a display light beam 165 emerging from an image displayed on an information display device 161 is reflected toward the object side by a surface 162 and enters a half mirror surface 163 formed from a concave surface. The display light beam 165 is reflected by the half mirror surface 163 and then converted into a nearly collimated light beam by the refracting power of the concave surface 163. The display light beam 165 is refracted and transmitted through the surface 162 to form an enlarged virtual image of the displayed image, and simultaneously enters a pupil 164 of the observer to allow him/her to see the display image.

An object light beam 166 from the object enters a surface 167 almost parallel to the reflecting surface 162, is refracted, and reaches the concave half mirror surface 163. The half mirror surface 163 is coated with a semi-transparent film. Some components of the object light beam 166 pass through the concave surface 163, are refracted and transmitted through the surface 162, and enter the pupil 164 of the observer. With this arrangement, the observer sees the displayed image that overlaps the landscape.

FIG. 17 is a schematic view of an observation optical system disclosed in Japanese Laid-Open Pat. Application No. 2-297516. This observation optical system also serves to observe an external landscape and simultaneously observes an image displayed on an information display device overlapping the landscape.

In this observation optical system, a display light beam 174 emerging from an information display device 170 is transmitted through a flat surface 177 of a prism Pa and enters the prism Pa and then a parabolic reflecting surface 171. The display light beam 174 is reflected by the reflecting surface 171 and forms an image on a focal-plane 176 as a focused light beam. The display light beam 174 reflected by the reflecting surface 171 is totally reflected by two flat surfaces 177 and 178 parallel to each other of the prism Pa and reaches the focal plane 176. With this arrangement, a low-profile optical system is achieved.

The display light beam 174 leaving the focal plane 176 as a divergent light beam is totally reflected by the flat surfaces 177 and 178 and enters a half mirror 172 having a parabolic surface. The display light beam 174 is reflected by this half mirror surface 172 and simultaneously forms an enlarged virtual image of the displayed image by the refracting power. At the same time, the display light beam 174 is transmitted through the surface 177 as a nearly collimated light beam and enters a pupil 173 of the observer, thereby allowing an observer to see the displayed image.

On the other hand, an object light beam 175 from the outside passes through a surface 178b of a prism Pb, the half mirror 172 having a parabolic surface, and the surface 177, and enters the pupil 173 of the observer. With this arrangement, the observer sees the displayed image that overlaps the landscape.

As examples of an optical system using an optical element for the reflecting surface of a prism, there are optical heads for optical pickups disclosed in, e.g., Japanese Laid-Open Pat. Application Nos. 5-12704 and 6-139612. In these optical systems, after light from a semiconductor laser is reflected by a Fresnel or hologram surface, an image is formed on a disk surface, and light reflected by the disk is guided to a detector.

To solve the above problems, the present applicant of the basic application filed in Japan has made a proposal aimed at providing a reflecting optical system which uses a plurality of optical elements, each of which has a plurality of curved or flat surfaces that are integrally formed, to reduce the size of the entire mirror optical system and also relax the arrangement precision (assembly precision) of reflecting mirrors, which is likely to be high in the mirror optical system, and an image pick-up apparatus using the reflecting optical system.

Referring to FIG. 18, in an optical element 51, a plurality of reflecting surfaces having curvatures are integrally formed. The optical element 51 has, sequentially from the object side, a concave refracting surface R2 having a negative refracting power, five reflecting surfaces of a concave mirror R3, a convex mirror R4, a concave mirror R5, a convex mirror R6, and a concave mirror R7, and a convex refracting surface R8. Incident and exit reference axes of the optical element 51 are made substantially parallel but opposite in direction. The optical system also has an optical correction plate 52 such as a quartz low-pass filter or an infrared cut filter, an image pick-up element surface 53 of a CCD or the like, a stop 54 inserted on the object side of the optical element 51, and a reference axis 55 of the photographing optical system.

The image forming relationship in FIG. 18 will be described. Light 56 from an object is limited in its light amount by the stop 54 and then enters the concave refracting surface R2 of the optical element 51.

The object light 56 incident on the concave refracting surface is converted into divergent light by the power of the concave refracting surface R2 and reflected by the concave mirror R3. At the same time, a primary object image is formed on an intermediate imaging plane N1 by the power of the concave mirror.

Having formed a primary image on the intermediate imaging plane N1, the object light 56 is repeatedly reflected by the convex mirror R4, concave mirror R5, convex mirror R6, and concave mirror R7 while being influenced by the power of each reflecting mirror, and reaches the convex refracting surface R8. The object light 56 refracted by the power of the convex refracting surface R8 forms an object image on the image pick-up element surface 53.

As described above, the optical element 51 functions as a lens unit which attains a desired optical performance and a positive power as a whole while repeating refraction by incident/exit surfaces and reflection by the plurality of reflecting mirrors having curvatures.

In recent years, extensive studies have been made for lenses having refractive index profile (to be referred to as "GRIN lenses" hereinafter), and some gradient index lenses have already been put into practical use. With the advent of GRIN lenses, optical designers can set new parameters and use GRIN lenses as effective means for correcting aberrations such as an aspherical surface effect. A GRIN lens has the following advantages.

It is compact and lightweight.

It can be tightly cemented to another optical element.

It can have an arbitrary focal length.

It can form an achromatic lens by itself.

It can form a high-dispersion prism.

As a method of manufacturing a GRIN lens, a method of forming a refractive index profile (distribution) by ion exchange, and a method using a ceramics manufacturing method called the sol-gel method are known. In the ion exchange method, preform glass is brought into contact with a molten salt containing ions to be diffused so as to form an ion distribution from the surface toward the inside in the preform glass member by ion exchange from the surface, thereby forming a refractive index profile. An example of the ion exchange method is disclosed in, e.g., Japanese Laid-Open Patent Application No. 62-47826. In the sol-gel method, materials for preform glass in a state of liquid are mixed to prepare a gel. The wet gel is dried and subjected to ion exchange in an ionic solution to form a refractive index profile in the gel. This gel is dried and calcined at a high temperature. An example of the sol-gel method is disclosed in, e.g., Japanese Laid-Open Patent Application No. 1-51335.

In the ion exchange method, however, the profile is determined in the process of performing ion exchange from the surface, so a refractive index profile is formed only near the surface. In addition, since the types of diffusible ions are limited, large differences of refractive indices in profile cannot be set.

In the sol-gel method, the shrinkage factor in high-temperature calcination is as high as several tens of percent, and crack occurs in the case of producing a large lens. In addition, since the degree of freedom in selecting materials is limited, large differences of refractive indices in profile cannot be obtained.

Japanese Laid-Open Patent Application No. 9-65246 discloses a method of using a decentered prism and a gradient index lens in an image display apparatus to generate aberration of opposite sign to that generated on the transmission surface of the decentered prism, thereby correcting chromatic aberration.

In all the mirror optical systems having decentered mirrors, which are disclosed in U.S. Pat. Nos. 3,674,334, 5,063,586, and 4,265,510, the reflecting mirrors have different decentering amounts. This arrangement considerably complicates the structure to which the reflecting mirrors are attached and also makes it very hard to ensure required attachment precision.

Both the observation optical systems disclosed in U.S. Pat. No. 4,775,217 and Japanese Laid-Open Patent Application No. 2-297516 mainly aim at obtaining the pupil imaging function for efficiently guiding the image displayed on the information display device spaced apart from the pupil of the observer to the pupil of the observer and changing the traveling direction of light. These prior disclosures do not directly disclose any techniques of positively correcting aberration using reflection surfaces having curvatures.

Both the optical systems for optical pickups, which are disclosed in Japanese Laid-Open Patent Application Nos. 5-12704 and 6-139612, are limited to use as detection optical systems and do not satisfy the imaging performance of a photographing optical system and, more specifically, a photographing apparatus using an area image pick-up element such as a CCD.

To correct aberration by a single GRIN lens, a large refractive-index difference Δn must be set. This is very difficult in terms of manufacturing the material required.

The image display apparatus disclosed in Japanese Laid-Open Patent Application No. 9-65246 requires two components: a decentered prism and gradient index lens. This is relatively ineffective in reducing the apparatus size or facilitating assembly.

SUMMARY OF THE INVENTION

It is an object of the present invention to provide an optical element suitable to a photographing or observation optical system which uses one or a plurality of optical elements, each of which has a plurality of curved or flat reflecting surfaces that are integrally formed, to reduce the size of the entire mirror optical system and also relaxes the arrangement precision (assembly precision) of reflecting mirrors, which is likely to be high in the mirror optical system, and an optical system using the optical element.

It is another object of the present invention to provide a reflecting optical element which reduces the effective diameter of an optical system, imparts appropriate refracting powers to a plurality of reflecting surfaces of the optical element, and decenters the reflecting surfaces of the optical element, thereby bending the optical path in the optical system into a desired shape and reducing the total length of the optical system in a predetermined direction, and an optical system using the optical element.

According to the present invention, there is provided an optical system having a refractive index distribution, comprising an optical unit having a light incident surface on which light is incident, a light reflecting surface having a curvature to reflect the light incident from the light incident surface, and a light exit surface from which the light reflected by the light reflecting surface emerges, and at least partially having a refractive index distribution.

In an optical element formed by integrally forming a refracting surface on which light is incident, a refracting surface from which the light emerges, and surface of a transparent member, a medium constituting the transparent member partially or entirely has a refractive index distribution.

The refractive index distribution is a radial type distribution in which a refractive index changes in a direction perpendicular to a reference axis of the light.

The refractive index distribution is an axial type distribution in which a refractive index changes in the direction of a reference axis of the light.

The refractive index distribution is a spherical type distribution in which a refractive index changes about one point on a reference axis of the light.

The spherical type refractive index distribution has a center of curvature at a reference point.

The refractive index distribution is a combination of some of the radial, axial, and spherical type distributions.

The elements are set such that the incident reference axis of an off-axial reflecting surface and the exit reference axis of another off-axial reflecting surface cross at least once in the medium having the refractive index distribution.

The optical element is manufactured by bonding an off-axial optical element made of uniform medium and made of uniform medium and having an incident surface, a plurality of reflecting surfaces with curvatures, and exit surfaces to an optical element having a refractive index distribution.

DESCRIPTION OF THE PREFERRED EMBODIMENTS

Figure 1:
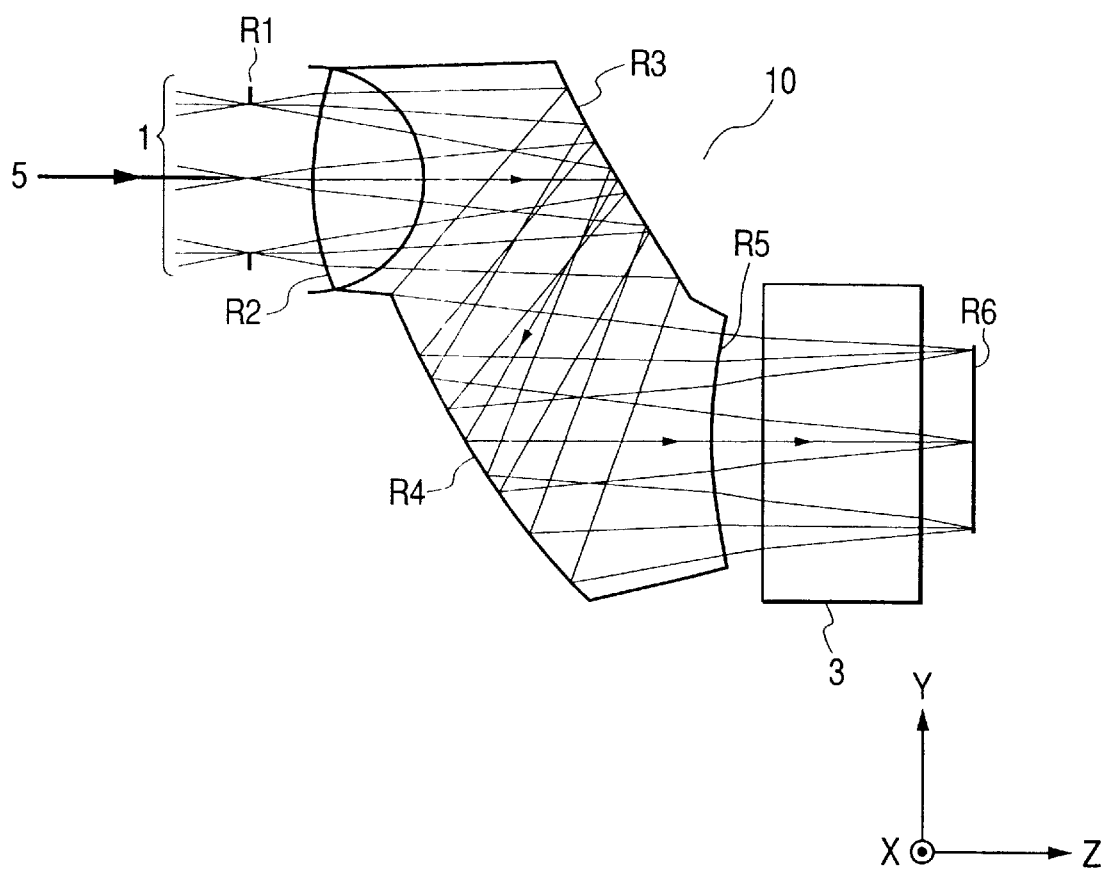
FIG. 1 is a sectional view in the Y-Z plane of an optical system according to the first embodiment of the present invention.

An optical element of the present invention and an optical system using the optical element do not have any symmetrical axis like the optical axis of a conventional optical system. For the optical system of the present invention, a "reference axis" corresponding to the optical axis of a coaxial system is set, and the arrangement of elements in the optical system will be described on the basis of this reference axis.

A definition of the reference axis will be given first. Generally, the optical path of a certain light beam having a reference wavelength and serving as a reference from an object surface to an image plane is defined as the "reference axis" of the optical system. However, the light beam as a reference cannot be set on the basis of only this definition. Normally, the reference axis light beam is set according to one of the following two principles.

(1) When an axis with symmetry is present, albeit partially, and aberration can be symmetrically set, a light beam on the axis having the symmetry is used as a reference axis light beam.

(2) When the optical system does not have any overall symmetrical axes, or when aberration cannot be symmetrically corrected although a symmetrical axis is partially present, a light beam coming from the object surface center (center of a region to be photographed or observed) and passing through the optical system in the order of designated planes of the optical system and the stop center in the optical system, or a light beam passing through the stop center in the optical system and reaching the center of a final image plane is set as a reference axis light beam, and the optical path of the light beam is defined as a reference axis.

The reference axis defined in the above way is generally bent. When viewed from outside the optical system, the reference axis can be handled like an optical axis. In each plane, the intersection of the plane and the reference axis light beam is set as a reference point of the plane. The reference axis light beam on the object side of each plane is defined as an incident reference axis, and that on the image side is defined as an exit reference axis. The reference axis has a direction (sense) in which the reference axis light beam travels to form an image. That is, incident and exit reference axis directions are present on the incident and exit sides, respectively. The reference axis changes in its direction in accordance with the laws of refraction or reflection in the order of planes and finally reaches the image plane.

In an optical element (optical system) having a plurality of surfaces, a reference axis light beam incident on a surface closest to the object is defined as the incident reference axis of the optical element (optical system), and a reference axis light beam emerging from a surface closest to the image is defined as an exit reference axis. Definitions of the directions of incident and exit reference axes are the same as those for a plane.

Before a description of embodiments, the definitions of specifications of embodiments and common matters of all embodiments will be described.

Figure 12:
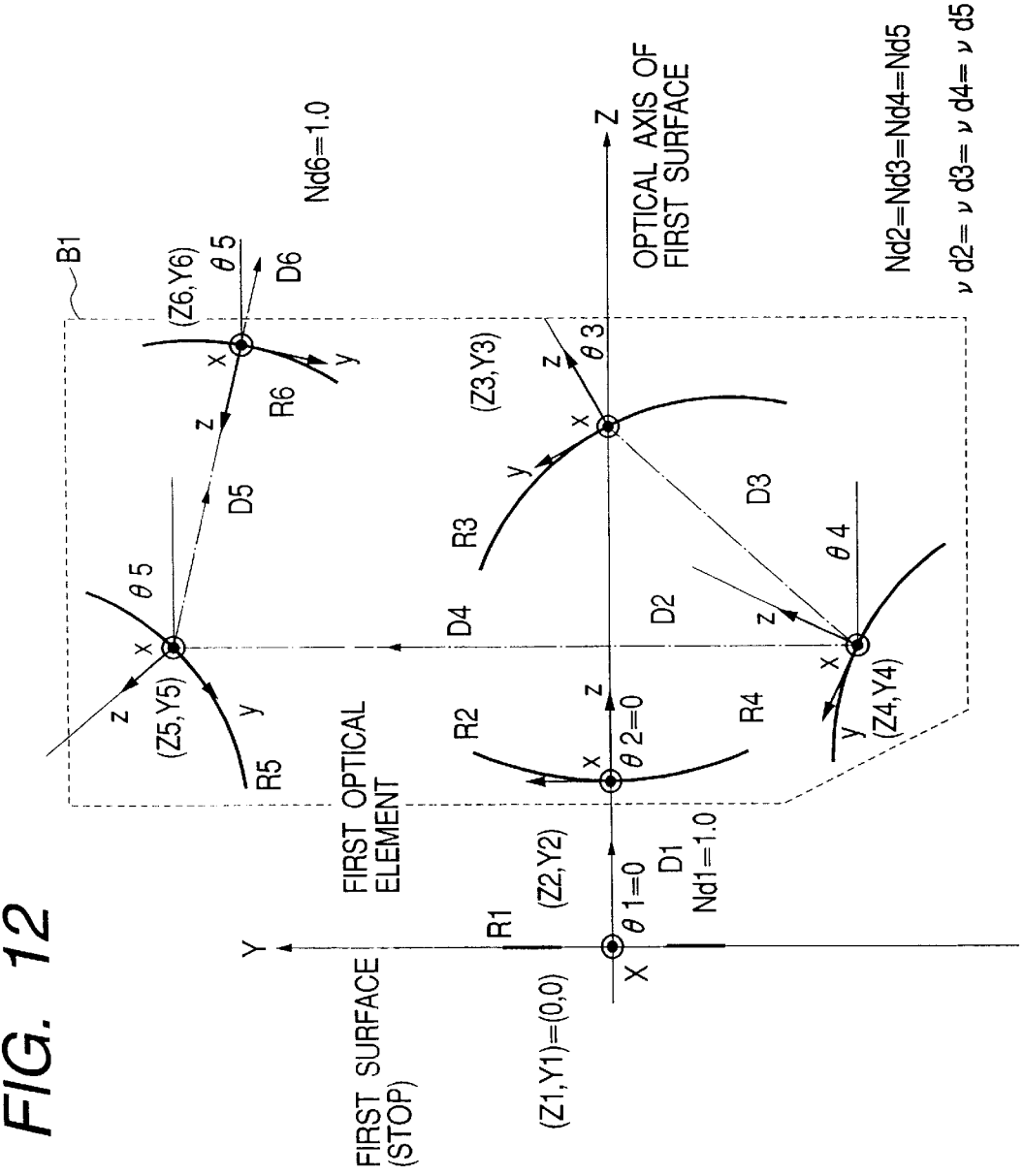
FIG. 12 is an explanatory view of a coordinate system in the embodiments of the present invention.
Figure 13:
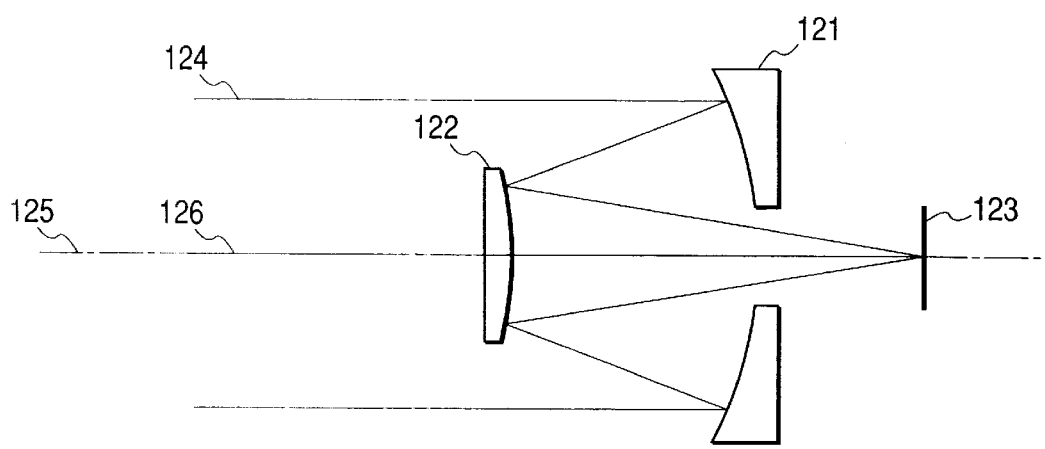
FIG. 13 is a view showing the basic arrangement of a conventional Cassegrain reflecting telescope.
Figure 14:
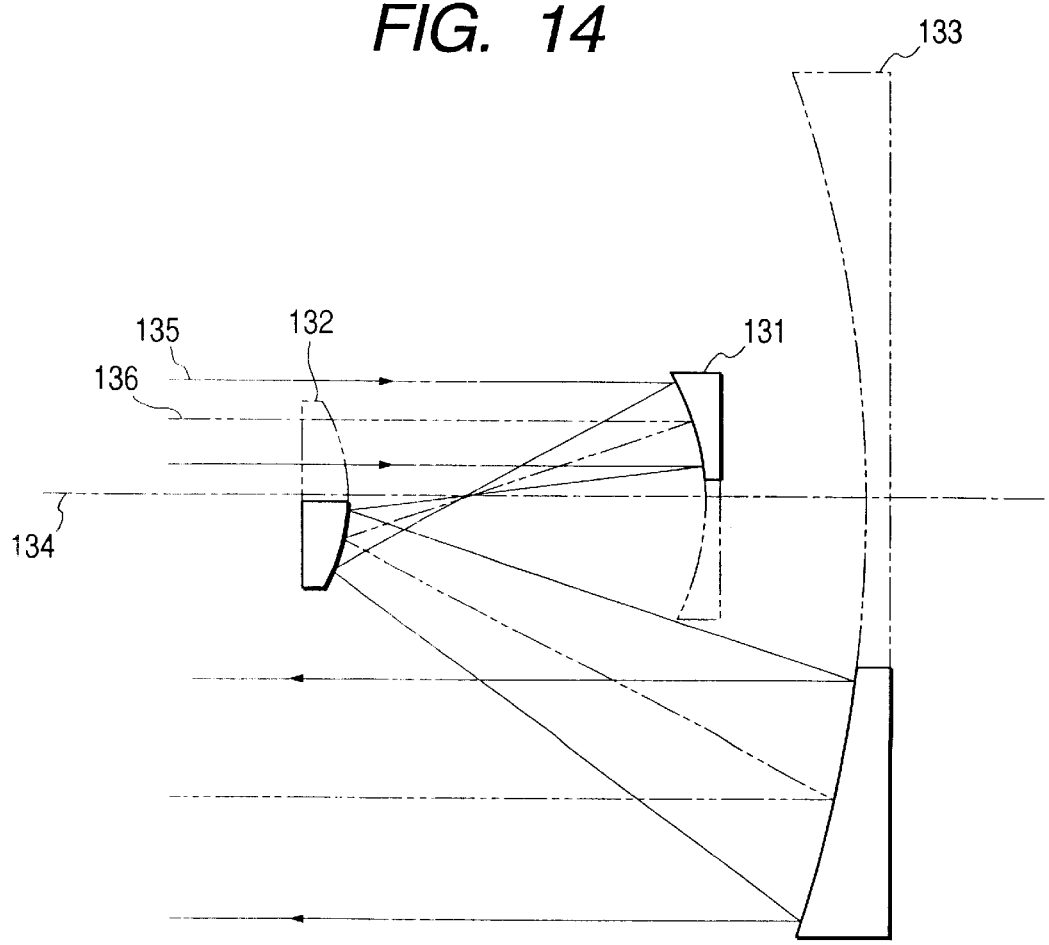
FIG. 14 is an explanatory view of a first method of separating a principal ray to prevent eclipse in a conventional mirror optical system.

FIG. 12 is an explanatory view of a coordinate system for defining numerical data of the optical system of the present invention. In the embodiments of the present invention, an i-th surface along one light beam (indicated by an alternate long and short dashed line in FIG. 12 and called a reference axis light beam) traveling from the object side toward the image plane is represented as the i-th surface.

Referring to FIG. 12, a first surface R1 is a stop, a second surface R2 is a refracting surface coaxial to the first surface, a third surface R3 is a reflecting surface tilted with respect to the second surface R2, fourth and fifth surfaces R4 and R5 are reflecting surfaces shifted and tilted with respect to the previous surface, and a sixth surface R6 is a refracting surface shifted and tilted with respect to the fifth surface R5. The second to sixth surfaces R2 to R6 are arranged on an optical element formed from a glass or plastic medium. The optical element is represented as a first optical element B1 in FIG. 12.

In the arrangement shown in FIG. 12, the medium between the object surface (not shown) and the second surface R2 is air, the space from the second surface R2 to the sixth surface R6 is filled with a common medium, and the medium between the sixth surface R6 and a seventh surface R7 (not shown) is air.

Since the optical system of the present invention is a decentered optical system, the surfaces constituting the optical system do not have any common optical axis. In the embodiments of the present invention, an absolute coordinate system whose origin is placed at the center of the light beam effective diameter of the first surface or the stop is set. In the present invention, the axes of the absolute coordinate system are defined as follows.

Z-axis: reference axis passing through the origin toward the second surface

Y-axis: straight line passing through the origin and making an angle of 90° counterclockwise with the Z-axis in the tilted surface (sheet surface of FIG. 12)

X-axis: straight line passing through the origin and perpendicular to the Z- and Y-axes (straight line perpendicular to the sheet surface of FIG. 12)

All tilted surfaces constituting the optical elements of the embodiments of the present invention are basically tilted in the same plane. That is, the reference axes in the optical element are basically present in one plane.

To express the shape of the i-th surface of the optical system, a local coordinate system whose origin is set at the reference point where the reference axis and the i-th surface cross is set, and the surface shape is expressed on the local coordinate system instead of expressing the surface shape in the absolute coordinate system. In the numerical data of the embodiments of the present invention, the surface shape of the i-th surface is expressed using the local coordinate system for easy understanding of the shape.

The tilt angle of the i-th surface in the Y-Z plane is represented by an angle $\theta i(°)$ for which the counterclockwise direction with respect to the Z-axis of the absolute coordinate system is defined as the positive direction. Hence, in the embodiments of the present invention, the origin of the local coordinates of each surface is present on the Y-Z plane in FIG. 12. The surfaces are neither tilted nor shifted in the X-Z and X-Y planes. The y- and z-axes of the local coordinates (x,y,z) of the i-th surface are tilted in the Y-Z plane with respect to the absolute coordinate system (X,Y,Z) through the angle ei. More specifically, the axes are set as follows.

z-axis: straight line passing through the origin of the local coordinate system and making the angle $\theta i$ counterclockwise in the Y-Z plane with the Z-direction of the absolute coordinate system y-axis: straight line passing through the origin of the local coordinate system and making an angle of 90° counterclockwise in the Y-Z plane with the z-direction x-axis: straight line passing through the origin of the local coordinate system and perpendicular to the Y-Z plane Additionally, Di is the scalar amount representing the interval between the i-th surface and the origin of the local coordinate system of the (i+1)th surface, and Ndi and vdi are the refractive index and Abbe's number of the medium between the i-th surface and the (i+1)th surface, respectively. The stop and final imaging plane are respectively expressed as one plane.

The embodiments of the present invention have spherical surfaces and rotationally asymmetric aspherical surfaces. For a spherical surface portion, a radius of curvature $R_i$ describes its spherical surface shape. The radius of curvature $R_i$ has a positive value when the center of curvature is present in the positive direction of Z-axis of the local coordinate system or a negative value when the center of curvature is present in the negative direction of Z-axis.

A spherical surface has a shape represented by $$z = \frac{(x^2 + y^2)/R_i}{1 + \{1 - (x^2 + y^2)/R_i^2\}^{1/2}}$$

A rotationally asymmetric aspherical surface in the optical system of the present invention has a shape represented by $A = (a+b) \cdot (y^2 \cdot \cos^2 t + x^2)$ $B = 2a \cdot b \cdot \cos t [1 + \{(b-a) \cdot y \cdot \sin t / (2a \cdot b)\} +$ $[1 + \{(b-a) \cdot y \cdot \sin t / (a \cdot b)\} - \{y^2/(a \cdot b)\} - \{4a \cdot b \cdot \cos^2 t +$ $(a+b)^2 \sin^2 t \} x^2 / (4a^2 b^2 \cos^2 t)]^{1/2}]$ for $z = A/B + C_{02}y^2 + C_{11}xy + C_{20}x^2 + C_{03}y^3 +$ $C_{12}xy^2 + C_{21}x^2y + C_{30}x^3 + C_{04}y^4 + C_{13}xy^3 +$ $C_{22}x^2y^2 + C_{31}x^3y + C_{40}x^4 + ...$ In the above curved surface expression, each rotationally asymmetric aspherical surface in the numerical examples of the present invention is a plane-based aspherical surface for which $a = b = \infty, t = 0$ When only even-degree terms associated with x are used, and odd-degree terms are set at 0, a surface symmetric with respect to the y-x plane is obtained. In addition, when $C_{03} = C_{21} = 0$ is satisfied, a shape symmetric with respect to the x-z plane is represented. Furthermore, when $C_{02} = C_{20}, C_{04} = C_{40} = C_{22}/2$ is satisfied, a rotationally symmetric shape is represented. When none of the above conditions are satisfied, a rotationally asymmetric shape is obtained.

In the embodiments of the optical system of the present invention, the first surface comprises a stop, as shown in FIG. 12. A horizontal half field angle $u_Y$ means the maximum field angle of a light beam incident on the stop R1 in the Y-Z plane in FIG. 12, and a vertical half field angle $u_X$ means the maximum field angle of a light beam incident on the stop R1 in the X-Z plane. The diameter of the stop R1 as the first surface is represented as a stop diameter. This is related to the brightness of the optical system. Since the entrance pupil is located on the first surface, the stop diameter equals the entrance pupil diameter.

The effective image range on the image plane is represented as an image size. The image size is represented by a rectangular region on the local coordinate system while setting its horizontal size in the y direction and vertical size in the x direction.

The optical element of the present invention has a refractive index distribution in a medium. The shape of the refractive index distribution is represented by:

Spherical type: $n(p) = n0 + n1 \cdot p + n2 \cdot p2 + n3 \cdot p3 + n4 \cdot p4 + ...$ p2=x2+y2+(z−r)2 where n0 is the refractive index of a base medium, r is the radius of the sphere of refractive indices distributed in a spherical shape, and n1, n2, . . . are coefficients of the 1st-order, 2nd-order, . . . terms.

Radial type: n(R)=n0·(1−(sqrt(A)*R)2/2)

R2=x2+y2 where n0 is the refractive index of a base medium, and A is the distribution coefficient.

Axial type: n(z)=n0+az where n0 is the refractive index of a base medium, a is the distribution coefficient, and x, y, and z are values on the local coordinate system.

For embodiments in which numerical data are presented, transverse aberration diagrams are shown. For each embodiment, the transverse aberration of a light beam whose horizontal and vertical incident angles with respect to the stop R1 are (uY,uX), (0,uX), (−uY,uX), (uY,0), (0,0), (−uY,0) is shown. In the transverse aberration diagram, the abscissa represents the incident height on the pupil, and the ordinate represents the aberration amount. In each embodiment, basically, since each surface is plane-symmetric with respect to the y-z plane, the transverse aberration is the same as that in the positive or negative direction of the vertical field angle. Hence, for the illustrative convenience, the transverse aberration in the negative direction is not illustrated.

The embodiments of an optical element of the present invention, and an optical system (photographing optical system) using the optical element will be described next.

FIG. 1 is a sectional view showing the first embodiment in which the optical element of the present invention is applied to a photographing optical system. FIG. 1 also shows the optical path. The Y-Z section is shown in FIG. 1.

Referring to FIG. 1, an optical element 10 has a plurality of curved reflecting surfaces and is formed from a transparent member of glass or the like. On the surface of the optical element 10, a convex refracting surface (incident surface) R2 having a positive refracting power, two reflecting surfaces R3 and R4, and a concave refracting surface (exit surface) R5 having a negative refracting power are formed in the order a light beam from the object passes through. The optical system also comprises a stop (entrance pupil) R1 arranged on the object side of the optical element 10, and a final imaging plane R6 on which the image pick-up surface of an image pick-up element (image sensing medium) such as a CCD is located. The optical system also has a reference axis 5 of the photographing optical system.

The two refracting surfaces R2 and R5 are rotationally symmetric spherical surfaces. All reflecting surfaces are anamorphic surfaces symmetric with respect to only the Y-Z plane.

In this embodiment, the medium near the incident surface R2 has a refractive index distribution. The distribution is a spherical distribution having its center of curvature at the origin of the surface R2. However, the refractive index distribution is formed in only a range until a depth of 3 mm from the surface (surface R2). The medium is uniform elsewhere.

The imaging function in this embodiment will be described next. A light beam 1 from an object is limited in its incident light amount by the stop R1, enters the incident surface R2 of the optical element 10, is reflected by the reflecting surfaces R3 and R4, emerges from the exit surface R5, and forms an image on the final imaging plane R6 through an optical correction plate 3.

In this embodiment, the incident reference axis on the optical element 10 and the exit reference axis from the optical element 10 are parallel and have the same sense (direction). All reference axes including the incident/exit reference axes are illustrated on the drawing (Y-Z plane). As described above, because of the refracting powers of the incident/exit surfaces R2 and R5 and the refracting power of the curved reflecting mirrors R3 and R4 between the surfaces R2 and R5, the optical element 10 functions as a lens unit having a desired optical performance and a positive refracting power as a whole.

In this embodiment, focusing on a near object is performed by moving the entire optical element 10 relative to the image pick-up surface R6 of the image pick-up element. Especially, in this embodiment, since the incident reference axis on the optical element 10 and the exit reference axis from the optical element 10 are parallel and have the same sense, focusing is performed, as in a conventional lens system, by translating the entire optical system in the direction of exit reference axis (Z-axis direction).

Figure 2:
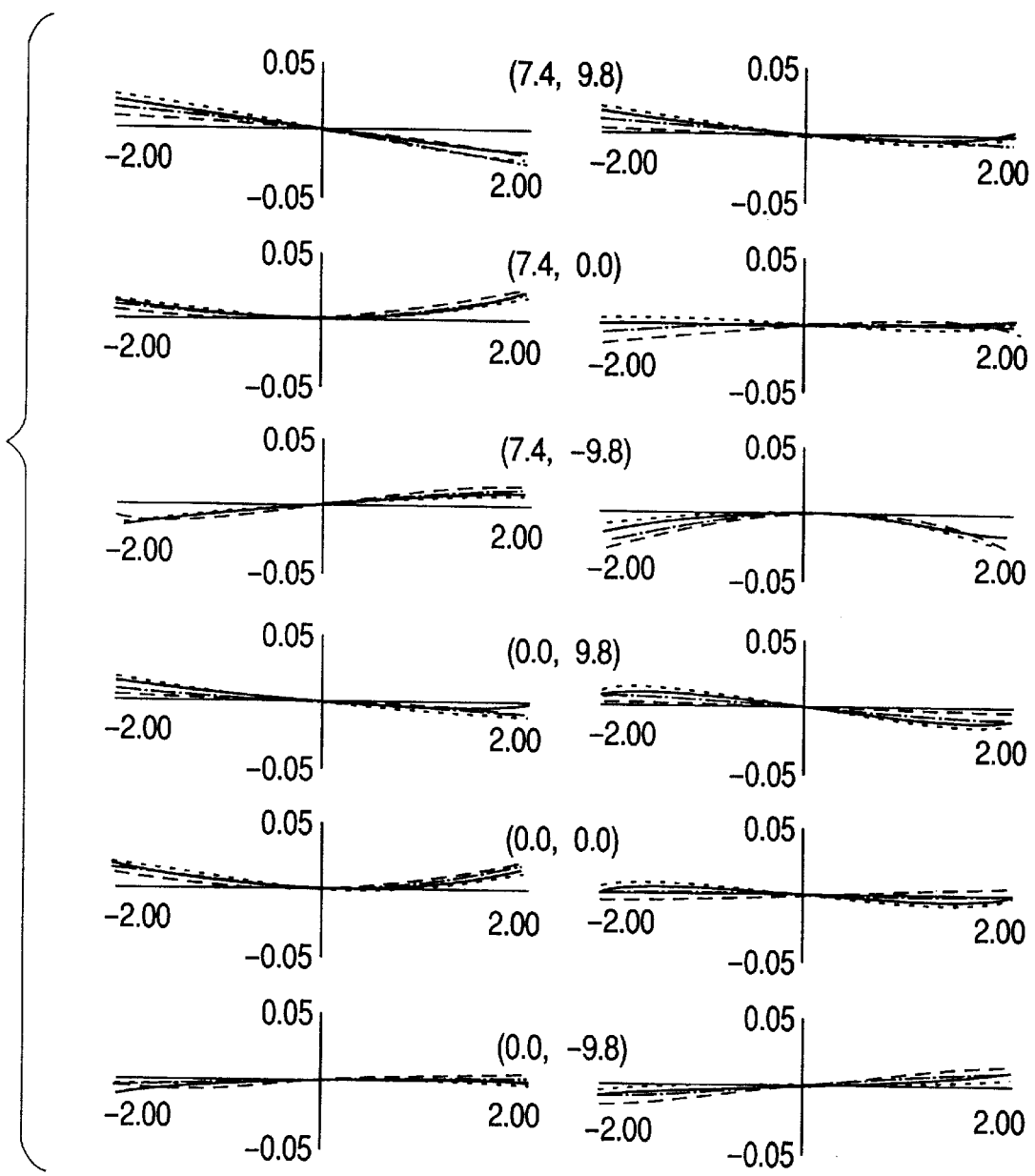
FIG. 2 is a view showing the transverse aberration in the first embodiment.

FIG. 2 is a view showing the transverse aberration of the optical system of this embodiment. Referring to FIG. 2, the dotted line indicates the c-line; the solid line, the d-line; the alternate long and short dashed line, the f-line; and the broken line, the g-line. As shown in FIG. 2, well balanced aberration correction is attained in this embodiment.

The effects of this embodiment will be described next.

In this embodiment, the incident surface R2 and exit surface R5 of the optical element 10 have refracting powers (optical powers). The shape of the exit surface R5 is determined such that the off-axis principal ray (pupil ray) on this surface becomes almost parallel, i.e., telecentric on the exit side (image side) in accordance with the incident angle. When an image pick-up device such as a CCD is used, a gap is present between the color filter of the CCD and the light-receiving surface. In this embodiment, by forming a telecentric system, the color separation performance of the image sensing element is prevented from changing in accordance with the incident angle. When the optical system is telecentric on the image side, principal rays of both the on- and off-axis light beams are substantially parallel to the optical axis, so the incident angle to the CCD is substantially constant across the light-receiving surface.

In this embodiment, a reflecting surface is an asymmetric anamorphic surface while the incident and exit surfaces R2 and R5 are rotationally symmetric with respect to the reference axis 5. With this arrangement, the reference axis 5 can be accurately measured in manufacturing or evaluating the optical system. In addition, by forming rotationally symmetric refracting surfaces, asymmetric chromatic aberration is decreased.

This embodiment has the following effects.

Figure 15:
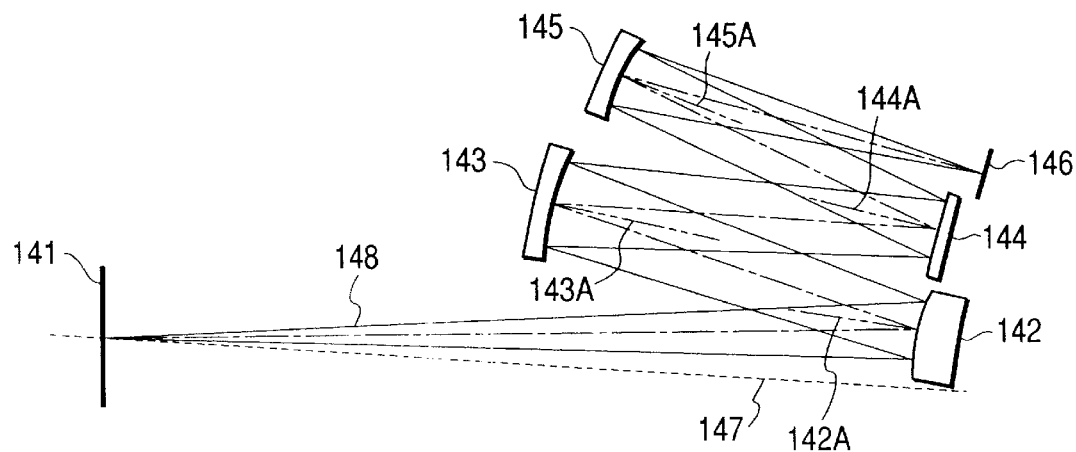
FIG. 15 is an explanatory view of a second method of separating the principal ray to prevent eclipse in the conventional mirror optical system.
Figure 16:
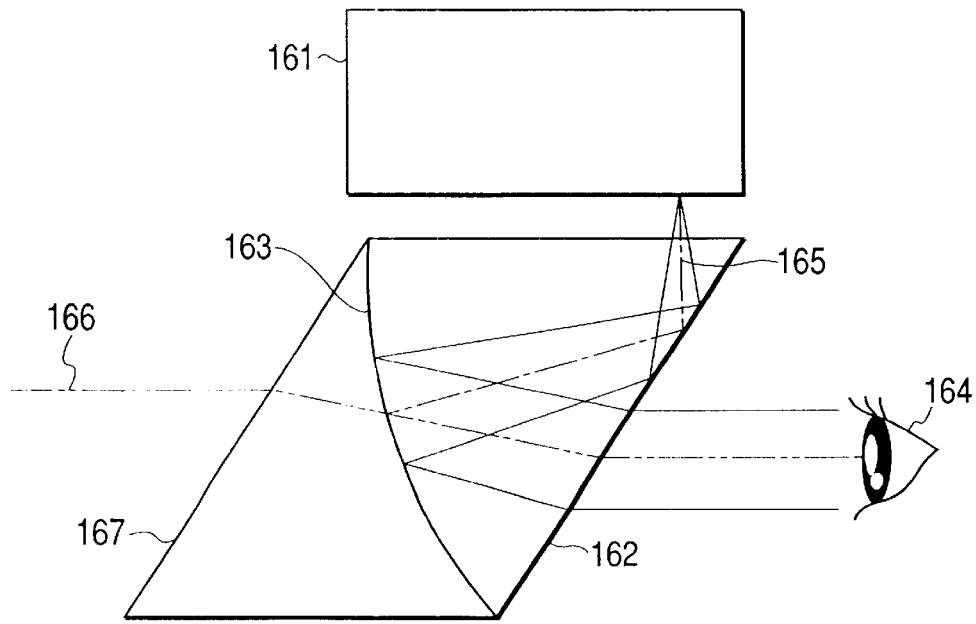
FIG. 16 is a view of a conventional observation optical system using a prism reflecting surface having a curvature.
Figure 17:
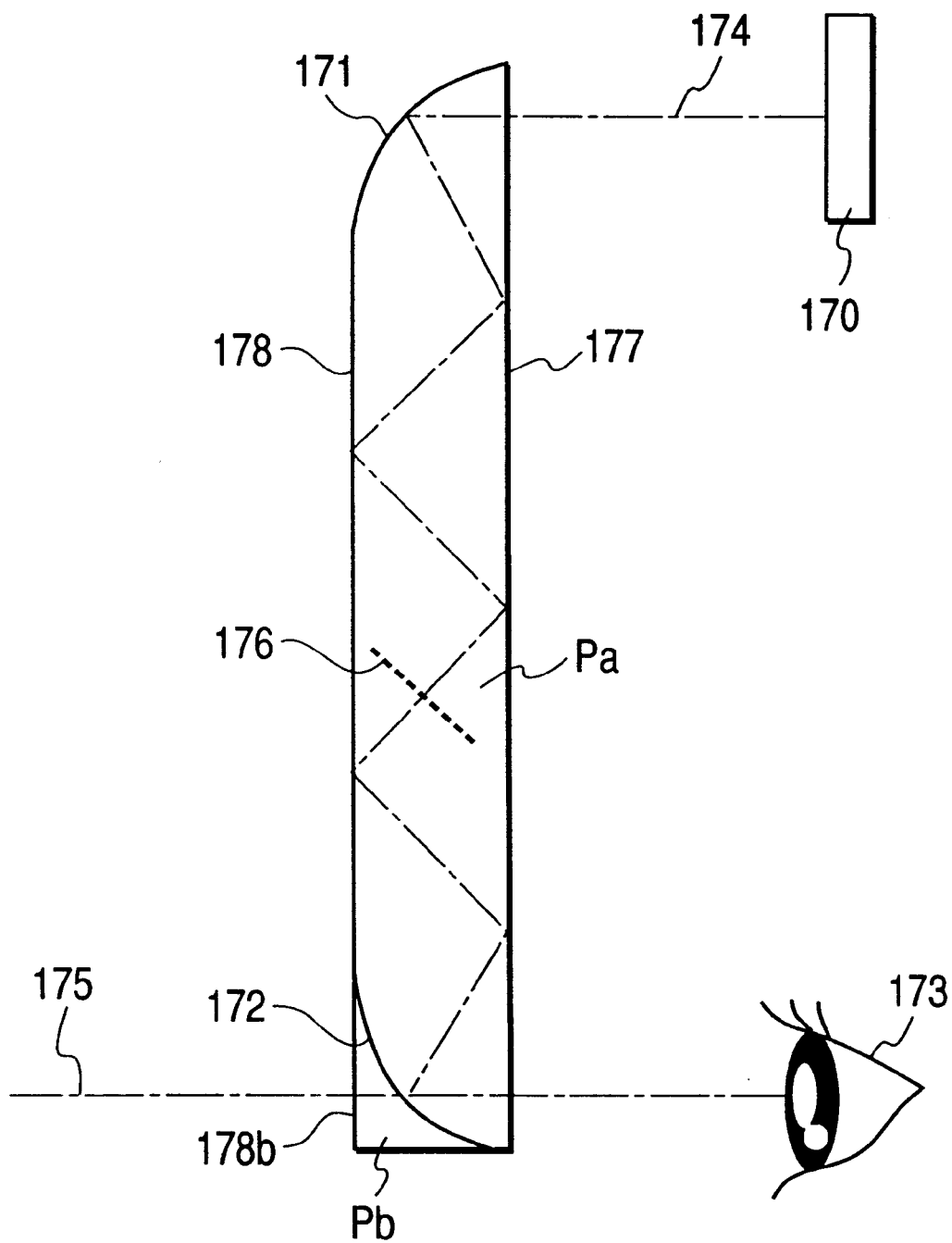
FIG. 17 is a view of another conventional observation optical system using prism reflecting surfaces having curvatures.
Figure 18:
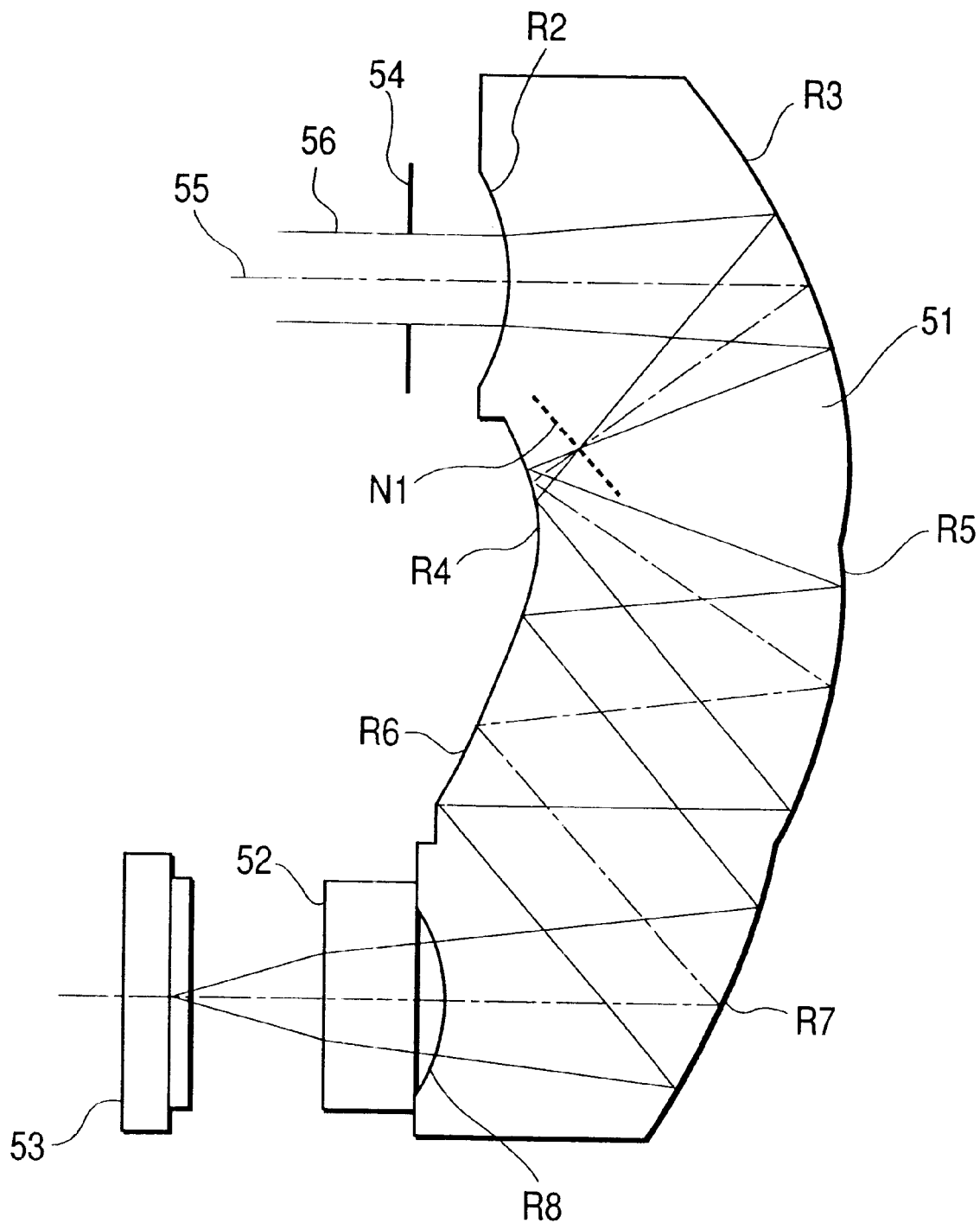
FIG. 18 is a view for explaining the optical path of an image pick-up apparatus according to another proposal of the present applicant of the basic application filed in Japan.

In the conventional optical system shown in FIG. 15, although the reflecting surfaces on the incident and exit sides have refracting powers, reflection between the reflecting surfaces simply acts as a so-called light guide for guiding a light beam. In this embodiment, at least two reflecting surfaces having refracting powers are integrally formed, thereby obtaining a compact high-performance photographing optical system having both the function of deflecting or bending the optical axis and the function of correcting aberration and capable of achieving a free shape.

In this embodiment, the reference axis 5 bent within the optical system lies in the same plane, i.e., in the sheet surface of FIG. 1. With this arrangement, the size in the direction (X-direction) perpendicular to the sheet surface is reduced. Each of the reflecting surfaces constituting the optical system is a so-called off-axial reflecting surface because the normal to the intersection of the incident/exit reference axis and the reflecting surface does not match the direction of the reference axis. This prevents any eclipse as in the conventional mirror optical system and allows a free arrangement. Hence, a compact optical element having a high space efficiency and free shape can be formed.

By partially forming a refractive index distribution in the medium of the optical element, chromatic aberration is corrected at the GRIN portion. Since no chromatic aberration is generated on the reflecting surfaces, the chromatic aberration can be satisfactorily corrected in the entire prism. The off-axial element portion bears the main power of the optical system, and the GRIN portion mainly bears chromatic aberration correction. With this arrangement, the refracting power of the GRIN portion is reduced to minimize the refractive index difference Δn required, thereby facilitating the manufacture of the optical element.

As a method of manufacturing an optical element having such a refractive index distribution, for example, after a prism is molded, the incident surface is covered with a mask having a hole at the reference point and dipped in a molten salt. An ion distribution is formed in the preform medium inward from the surface by ion exchange from the surface, thereby forming a refractive index distribution.

The numerical data of this embodiment are as follows.

[First Embodiment]

| | Horizontal half field angle | | | | 9.8 | |
| | Vertical half field angle | | | | 7.4 | |
| | Stop diameter | | | | 4.00 | |
| i | Yi | Zi | θi | Di | Ndi | vdi |
| 1 | 0.00 | 0.00 | 0.00 | 1.60 | 1 | stop |
| 2 | 6.00 | 1.60 | 0.00 | 8.00 | GRIN | refracting surface |
| 3 | 0.00 | 9.60 | 30.00 | 8.00 | 1.52822 | 52.50 reflecting surface |
| 4 | −6.93 | 5.60 | 30.00 | 6.50 | 1.52822 | 52.50 reflecting surface |
| 5 | −6.93 | 12.10 | 0.00 | 1.40 | 1 | refracting surface |
| 6 | −6.93 | 18.90 | 0.00 | | 1 | image plane |

Spherical shape
Surface R2 r2=8.950
Surface R5 r5=7.596
Aspherical shape
Surface R3

$C02=1.84879e-02$ $C20=1.01935e-02$ $C03=1.31496e-04$ $C21=-6.15362e-05$ $C04=5.95400e-06$ $C22=1.20760e-05$ $C40=-1.73979e-05$

Surface R4

$C02=2.18942e-02$ $C20=1.45900e-02$ $C03=-2.06074e-04$ $C21=-2.30328e-04$ $C04=1.05021e-05$ $C22=-3.87134e-05$ $C40=-7.90589e-05$

Refractive index distribution shape and distribution coefficient

| | Spherical type | | | |
| --- | --- | --- | --- | --- |
| | c-line | d-line | f-line | g-line |
| n0 | 1.530844 | 1.533331 | 1.539023 | 1.543439 |
| n1 | 5.327e-04 | 2.123e-04 | −2.687e-06 | −3.198e-04 |
| n2 | −8.063e-04 | −6.390e-04 | −4.187e-04 | −1.842e-04 |
| r | 0 | 0 | 0 | 0 |

Figure 3:
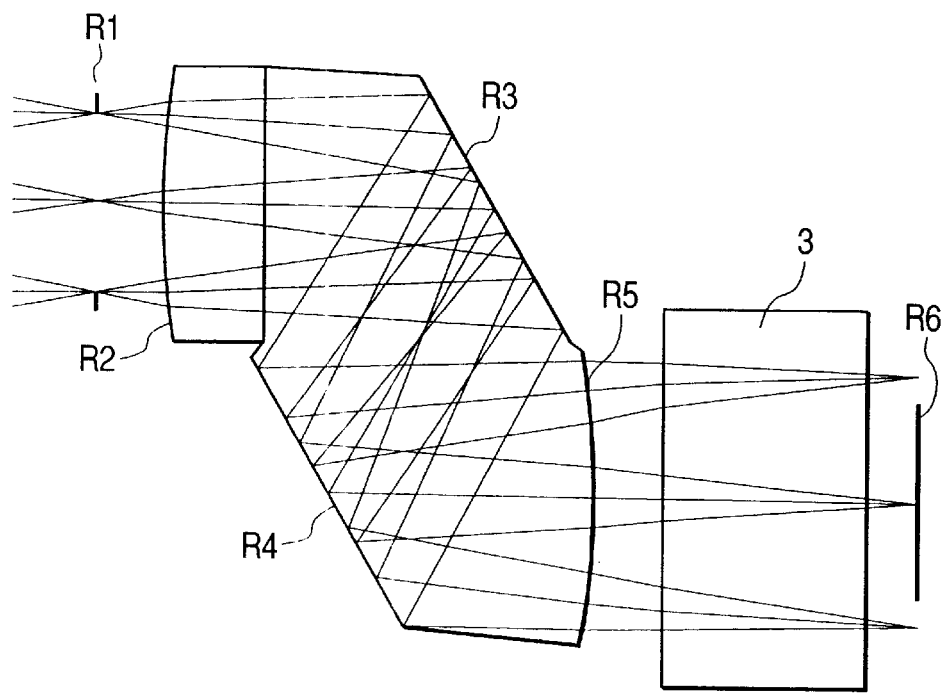
FIG. 3 is a sectional view in the Y-Z plane of an optical system according to the second embodiment of the present invention.

FIG. 3 is a schematic view showing the second embodiment in which the optical element of the present invention is applied to a photographing optical system. The same reference numerals as in FIG. 1 denote the same elements in FIG. 3.

In this embodiment, the medium in the vicinity the incident surface has a refractive index distribution. The distribution is an axial distribution.

Figure 4:
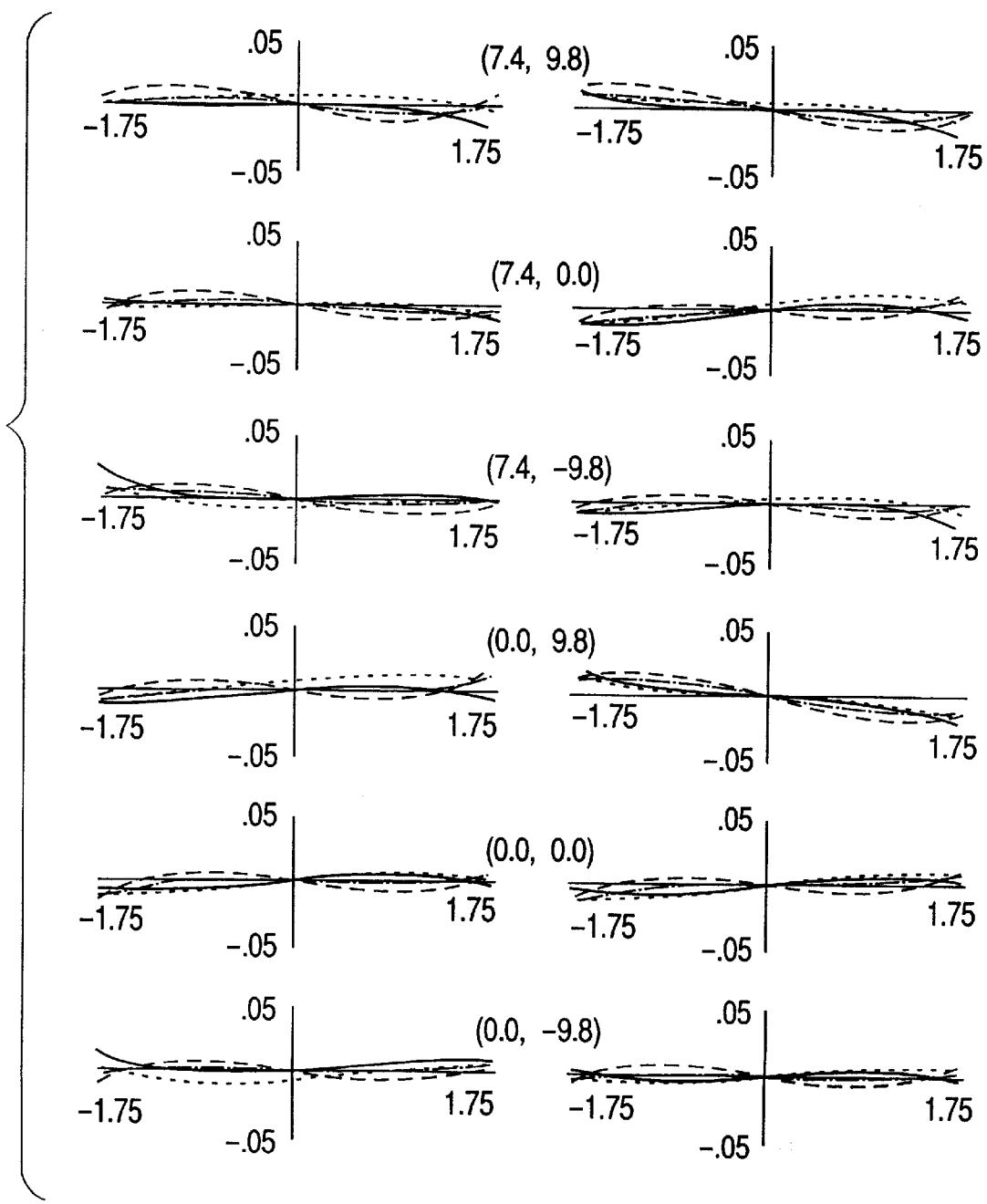
FIG. 4 is a view showing the transverse aberration in the second embodiment.

FIG. 4 is a view showing the transverse aberration of the optical system of this embodiment. Referring to FIG. 4, the dotted line indicates the c-line; the solid line, the d-line; the alternate long and short dashed line, the f-line; and the broken line, the g-line. As shown in FIG. 4, well balanced aberration correction is realized in this embodiment.

The off-axial portion mainly corrects decentering aberration. The GRIN portion has an aspherical surface effect although the refracting surface is spherical, and therefore, can correct rotationally symmetric aberration. Hence, this arrangement is advantageous for aberration correction.

As a method of manufacturing an optical element having such a refractive index distribution, for example, after a prism having a flat incident surface is molded, an axial refractive index distribution is formed from the incident surface, and then, the incident surface is formed into a curved surface. Alternatively, a flat plate having an axial distribution is formed into a spherical shape and bonded to a prism.

The numerical data of the second embodiment of the present invention are as follows.

[Second Embodiment]

| | Horizontal half field angle | | | | 9.8 | |
| | Vertical half field angle | | | | 7.4 | |
| | Stop diameter | | | | 3.50 | |
| i | Yi | Zi | θi | Di | Ndi | vdi |
| 1 | 0.00 | 0.00 | 0.00 | 1.28 | 1 | stop |
| 2 | 0.00 | 1.28 | 0.00 | 6.40 | GRIN | refracting surface |
| 3 | 0.00 | 7.68 | 30.00 | 6.40 | 1.48700 | 70.40 reflecting surface |
| 4 | −5.54 | 4.48 | 30.00 | 5.20 | 1.48700 | 70.40 reflecting surface |
| 5 | 5.54 | 9.68 | 0.00 | 1.30 | 1 | refracting surface |
| 6 | −5.54 | 15.98 | 0.00 | | 1 | image plane |

Spherical shape
Surface R2 r2=13.628
Surface R5 r6=−15.638
Aspherical shape
Surface R3

$C02=-6.25182e-04$ $C20=-1.23028e-03$ $C03=1.23878e-05$ $C21=3.96725e-06$ $C04=-2.85625e-05$ $C22=-6.13030e-05$ $C40=-6.24598e-05$

Surface R4

$C02=8.99528e-04$ $C20=2.78334e-04$ $C03=4.64085e-06$ $C21=-4.30489e-05$ $C04=-6.73998e-05$ $C22=-1.55569e-04$ $C40=-1.39037e-04$

Refractive index distribution shape and distribution coefficient

| | Axial type | | | |
| --- | --- | --- | --- | --- |
| | c-line | d-line | f-line | g-line |
| n0 | 1.697950 | 1.700000 | 1.707110 | 1.715443 |
| a | −3.085e-02 | −1.528e-02 | −1.281e-01 | −2.073e-01 |

Figure 5:
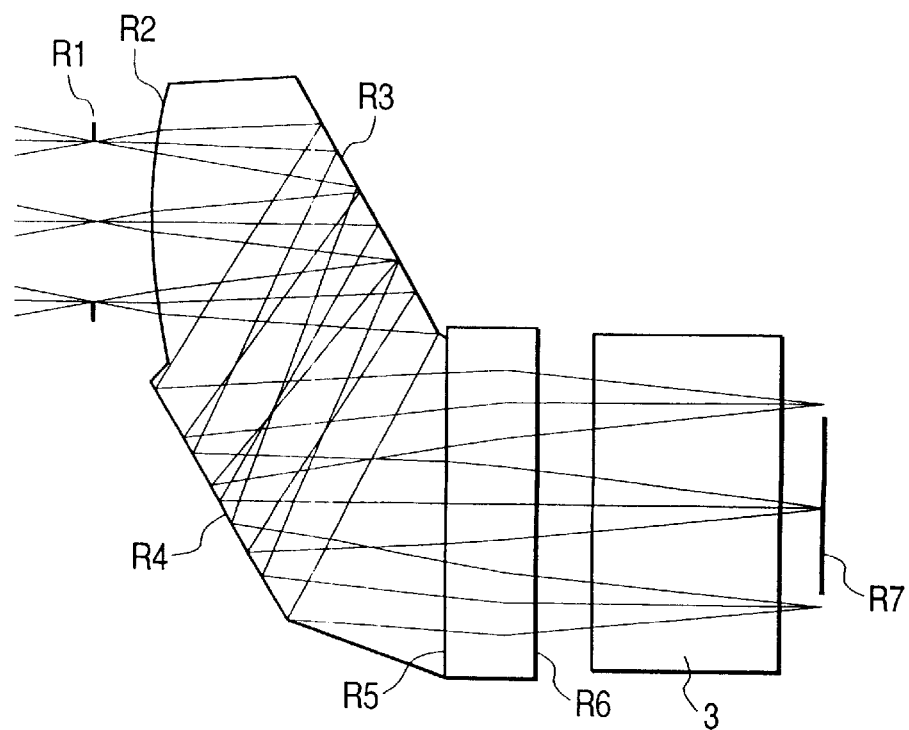
FIG. 5 is a sectional view in the Y-Z plane of an optical system according to the third embodiment of the present invention.

FIG. 5 is a schematic view showing the third embodiment in which the optical element of the present invention is applied to a photographing optical system. The same reference numerals as in FIG. 1 denote the same elements in FIG. 5.

In this embodiment, the medium near the exit surface has a refractive index distribution. The distribution is a radial distribution.

Figure 6:
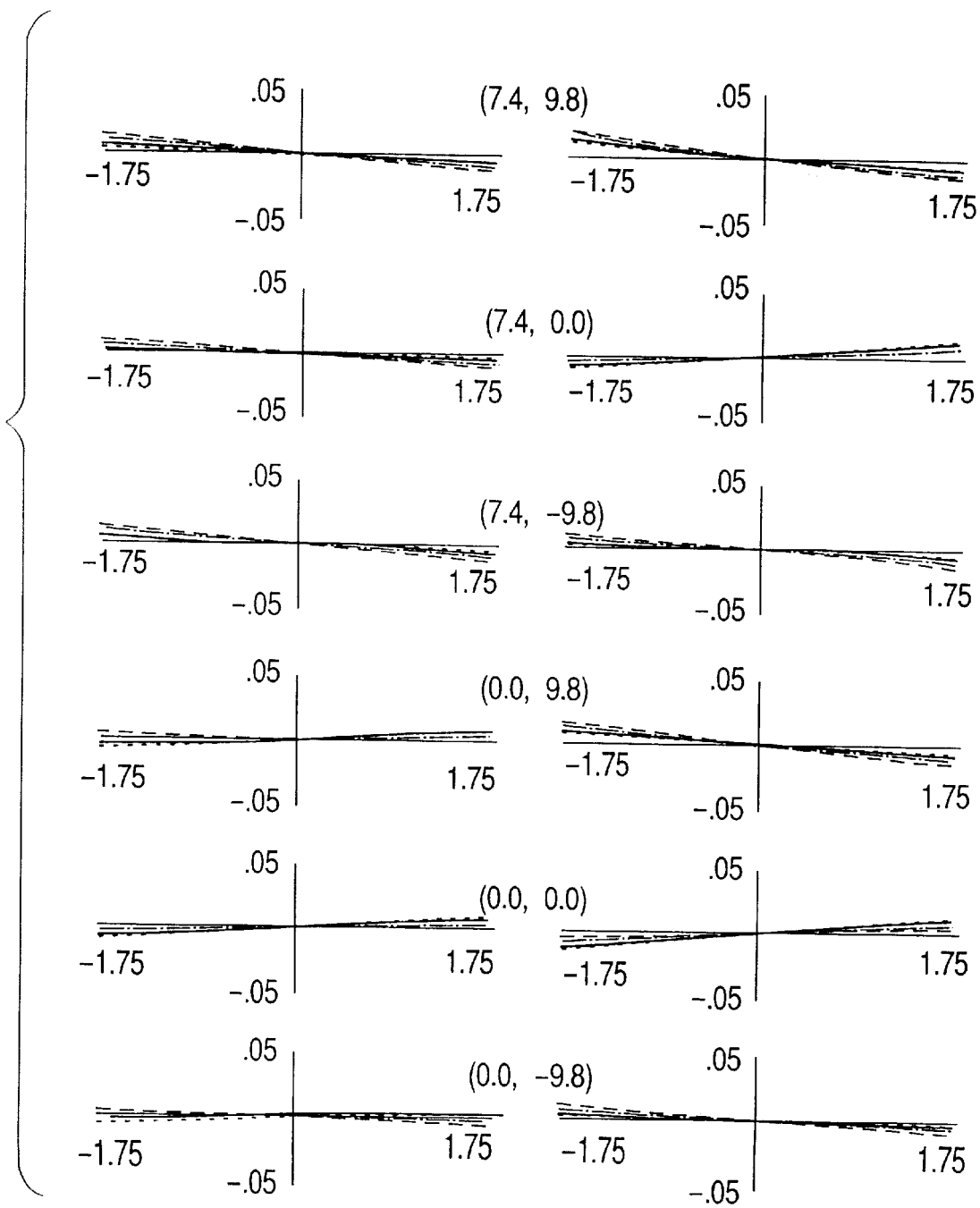
FIG. 6 is a view showing the transverse aberration in the third embodiment.

FIG. 6 is a view showing the transverse aberration of the optical system of this embodiment. Referring to FIG. 6, the dotted line indicates the c-line; the solid line, the d-line; the alternate long and short dashed line, the f-line; and the broken line, the g-line. As shown in FIG. 6, well balanced aberration correction is achieved in this embodiment.

The off-axial element portion bears the main power of the optical system, and the GRIN portion mainly bears chromatic aberration correction. With this arrangement, the refracting power of the GRIN portion can be small to reduce the necessary refractive index difference Δn, thereby facilitating the manufacture of the optical element.

As a method of manufacturing an optical element having such a refractive index distribution, for example, the exit surface is covered with a mask and dipped in a molten salt, thereby forming a refractive index distribution from the side surface portion of a cylindrical member near the exit surface. Alternatively, a lens having a radial distribution is bonded to a prism. The numerical data of the third embodiment are as follows.

[Third Embodiment]

| | Horizontal half field angle | | | | | 9.8 | |
|---|---|---|---|---|---|---|---|
| | Vertical half field angle | | | | | 7.4 | |
| | Stop diameter | | | | | 3.50 | |
| i | Yi | Zi | θi | Di | Ndi | vdi | |
| 1 | 0.00 | 0.00 | 0.00 | 1.28 | 1 | | stop |
| 2 | 0.00 | 1.28 | 0.00 | 5.00 | 1.51633 | 64.15 | refracting surface |
| 3 | 0.00 | 6.28 | 30.00 | 7.00 | 1.51633 | 64.15 | reflecting surface |
| 4 | −6.06 | 2.78 | 30.00 | 5.00 | 1.51633 | 64.15 | reflecting surface |
| 5 | −6.06 | 7.78 | 0.00 | 2.00 | GRIN | | refracting surface |
| 6 | −6.06 | 9.78 | 0.00 | 1.30 | 1 | | refracting surface |
| 7 | −6.06 | 16.08 | 0.00 | | 1 | | image plane |

Spherical shape
Surface R2 r2=13.646
Surface R5 r5=∞
Surface R6 r6=105.897
Aspherical shape
Surface R3
    C02=−3.04681e−03 C20=−4.10667e−03
    C03=5.75544e−05 C21=6.45823e−05
    C04=2.44996e−08 C22=9.95117e−06 C40=1.47986e−06
Surface R4
    C02=−3.24919e−03 C20=−4.52130e−03
    C03=1.04329e−04 C21=1.02292e−04
    C04=−4.26478e−05 C22=−8.76088e−05 C40=−7.16414e−05
Refractive index distribution shape and distribution coefficient

| | Radial type | | | |
|---|---|---|---|---|
| | c-line | d-line | f-line | g-line |
| n0 | 1.513855 | 1.516330 | 1.521904 | 1.526211 |
| sqrt(A) | 1.693e−01 | 1.689e−01 | 1.682e−01 | 1.677e−01 |

Figure 7A:
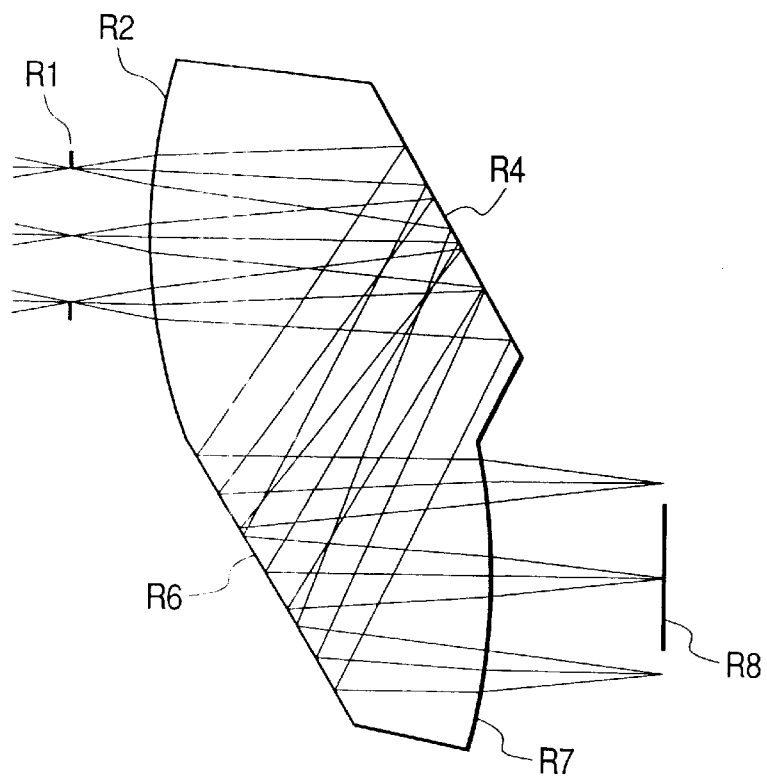
FIGS. 7A and 7B are sectional views in the Y-Z plane of an optical system according to the fourth embodiment of the present invention.

FIG. 7A is a schematic view showing the fourth embodiment in which the optical element of the present invention is applied to a photographing optical system. The same reference numerals as in FIG. 1 denote the same elements in FIG. 7A.

Figure 7B:
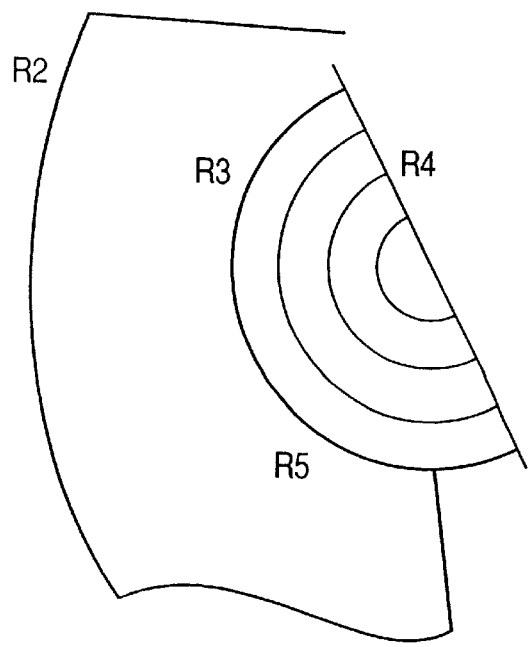

In the optical element of this embodiment, the medium in the vicinity of the reflecting surface (surface R4) has a refractive index distribution. The distribution is a spherical distribution having its center of curvature at the reference point of the surface R4. FIG. 7B shows the refractive index distribution.

When a medium has a refractive index distribution in the vicinity of the reflecting surface of a prism filled with the medium, the reference axis light beam propagates through different optical paths before and after the reflection surface. For this reason, generally, the reference axis light beam is also deflected by the influence of the refractive index distribution. However, in a spherical type refractive index distribution having its center of curvature at the reference point, the reference axis light beam always travels perpendicular to the equi-index line and travels straight without being influenced by the refractive index distribution. For an off-axis light beam (light beam other than the reference axis light beam) as well, the refractive index distribution is symmetric with respect to the reference axis, so asymmetric aberration hardly occurs.

Figure 8:
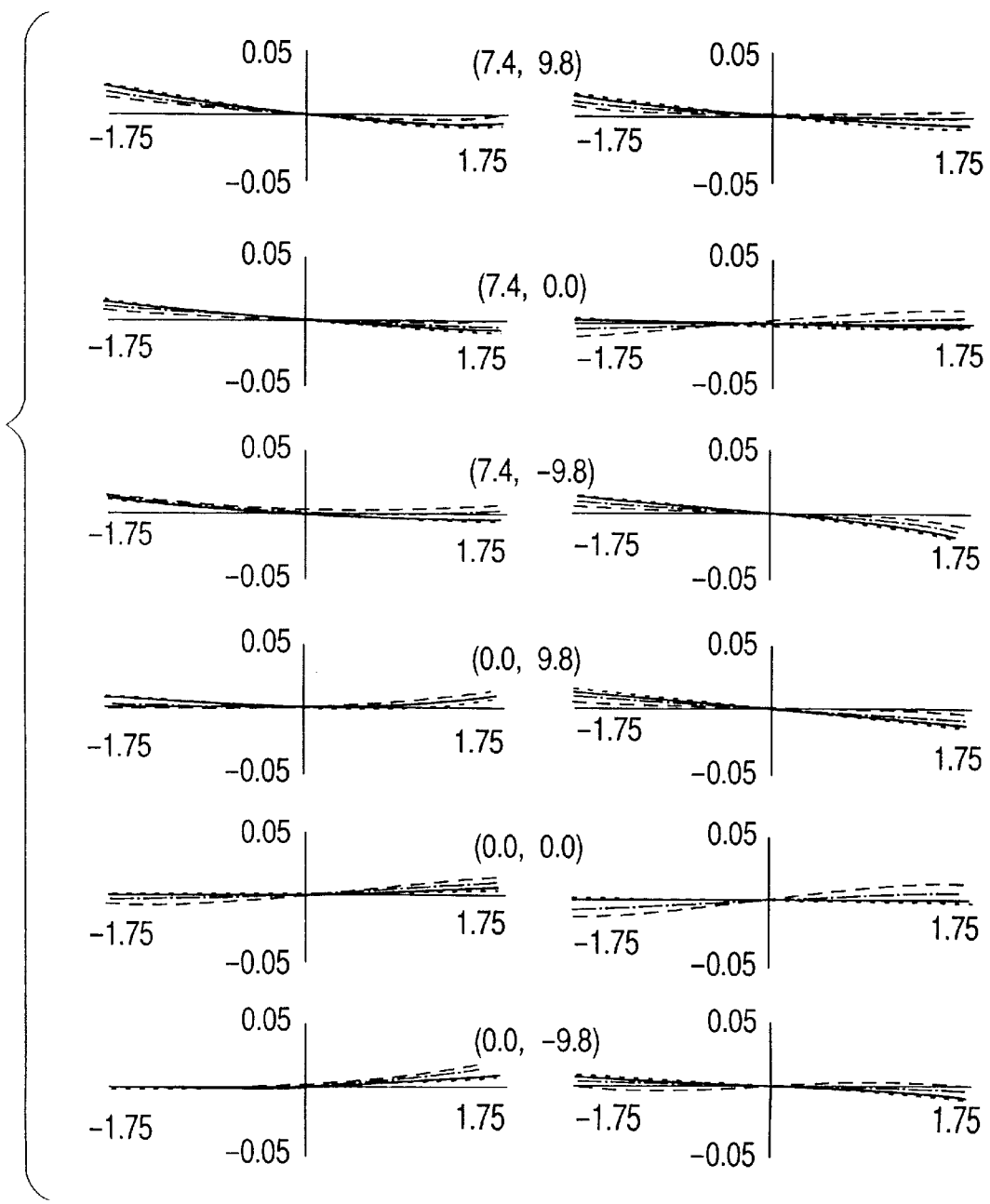
FIG. 8 is a view showing the transverse aberration in the fourth embodiment.

FIG. 8 is a view showing the transverse aberration of the optical system of this embodiment. Referring to FIG. 8, the dotted line indicates the c-line; the solid line, the d-line; the alternate long and short dashed line, the f-line, and the broken line, the g-line. As shown in FIG. 8, well balanced aberration correction is obtained in this embodiment.

As a method of manufacturing an optical element having such a refractive index distribution, for example, a prism is covered with a mask having a hole at the reference point and dipped in a molten salt. An ion distribution is formed in the preform medium inward from the surface by ion exchange from the surface, thereby forming a refractive index distribution.

The numerical data of this embodiment are as follows.

[Fourth Embodiment]

| | Horizontal half field angle | | | | | 9.8 | |
|---|---|---|---|---|---|---|---|
| | Vertical half field angle | | | | | 7.4 | |
| | Stop diameter | | | | | 3.50 | |
| i | Yi | Zi | θi | Di | Ndi | vdi | |
| 1 | 0.00 | 0.00 | 0.00 | 2.00 | 1 | | stop |
| 2 | 0.00 | 2.00 | 0.00 | 4.00 | 1.55865 | 63.99 | refracting surface |
| 3 | 0.00 | 6.00 | 0.00 | 4.00 | GRIN | | refracting surface |
| 4 | 0.00 | 10.00 | 30.00 | 4.00 | GRIN | | reflecting surface |
| 5 | −3.46 | 8.00 | 60.00 | 6.00 | 1.55865 | 63.99 | refracting surface |
| 6 | −8.66 | 5.00 | 30.00 | 6.00 | 1.55865 | 63.99 | reflecting surface |
| 7 | −8.66 | 11.00 | 0.00 | 4.32 | 1 | | refracting surface |
| 8 | −8.66 | 15.32 | −0.00 | | 1 | | image plane |

Spherical shape
Surface R2 r2=13.914
Surface R7 r9=−16.686
Aspherical shape
Surface R4
    C02=−2.08517e−04 C20=−5.82742e−03
    C03=5.80058e−05 C21=8.84213e−05
    C04=8.62241e−06 C22=1.97117e−05 C40=1.31147e−06
Surface R6
    C02=4.68679e−03 C20=−1.14050e−02
    C03=1.61946e−05 C21=3.44913e−04
    C04=−2.17998e−05 C22=−7.76908e−05 C40=−1.13931e−04
Refractive index distribution shape and distribution coefficient

| Spherical type | | | | |
|---|---|---|---|---|
| | c line | d line | f line | g line |
| n0 | 1.556078 | 1.558642 | 1.563763 | 1.567671 |
| n1 | −0.5206E-04 | −0.9946E-05 | 0.9276E-04 | 0.2005E-03 |
| n2 | −0.3202E-04 | 0.2773E-05 | 0.1708E-04 | 0.3064E-04 |

Figure 9:
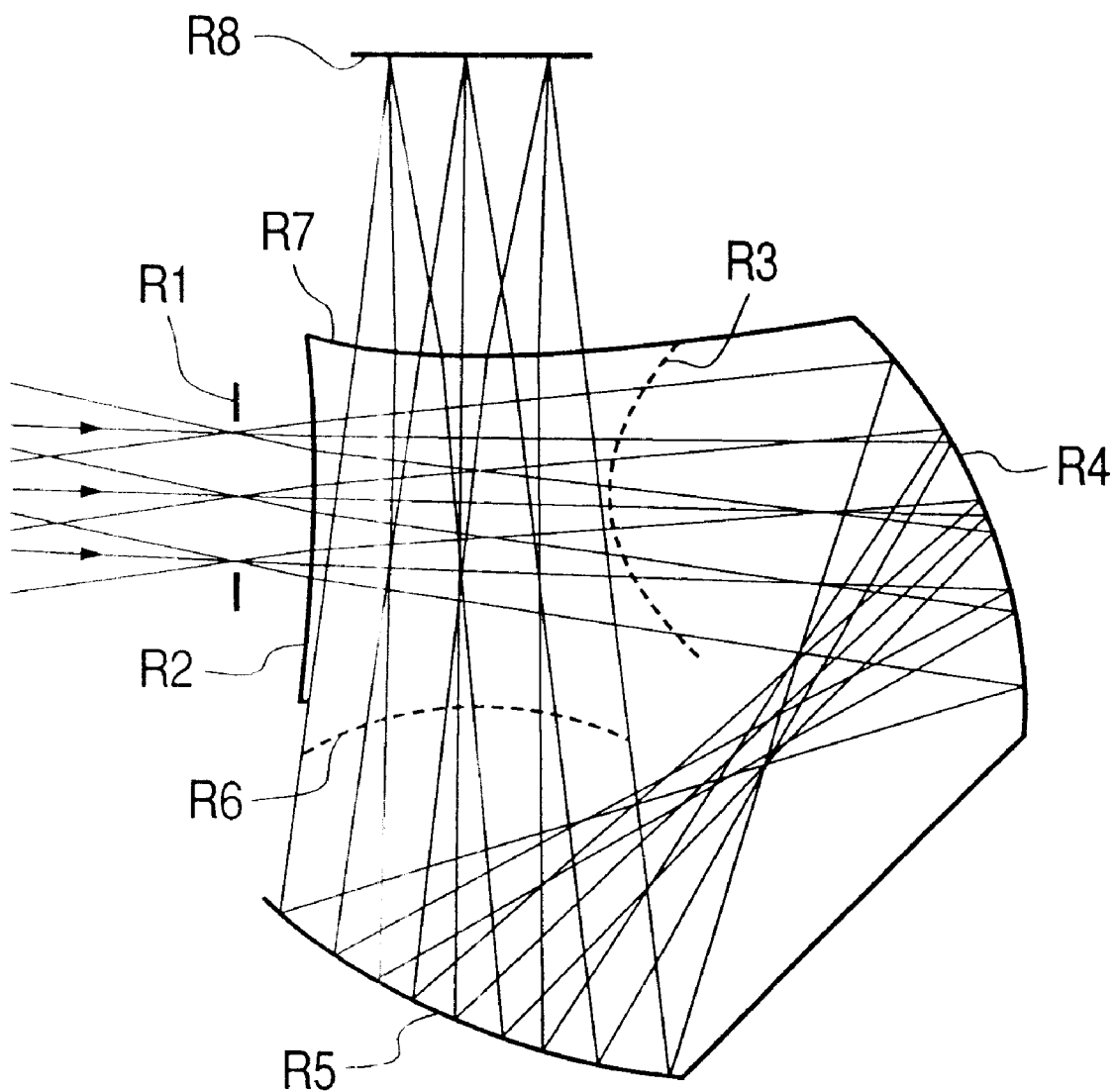
FIG. 9 is a sectional view in the Y-Z plane of an optical system according to the fifth embodiment of the present invention.

FIG. 9 is a schematic view showing the fifth embodiment in which the optical element of the present invention is applied to a photographing optical system. The same reference numerals as in FIG. 1 denote the same elements in FIG. 9.

Figure 10:
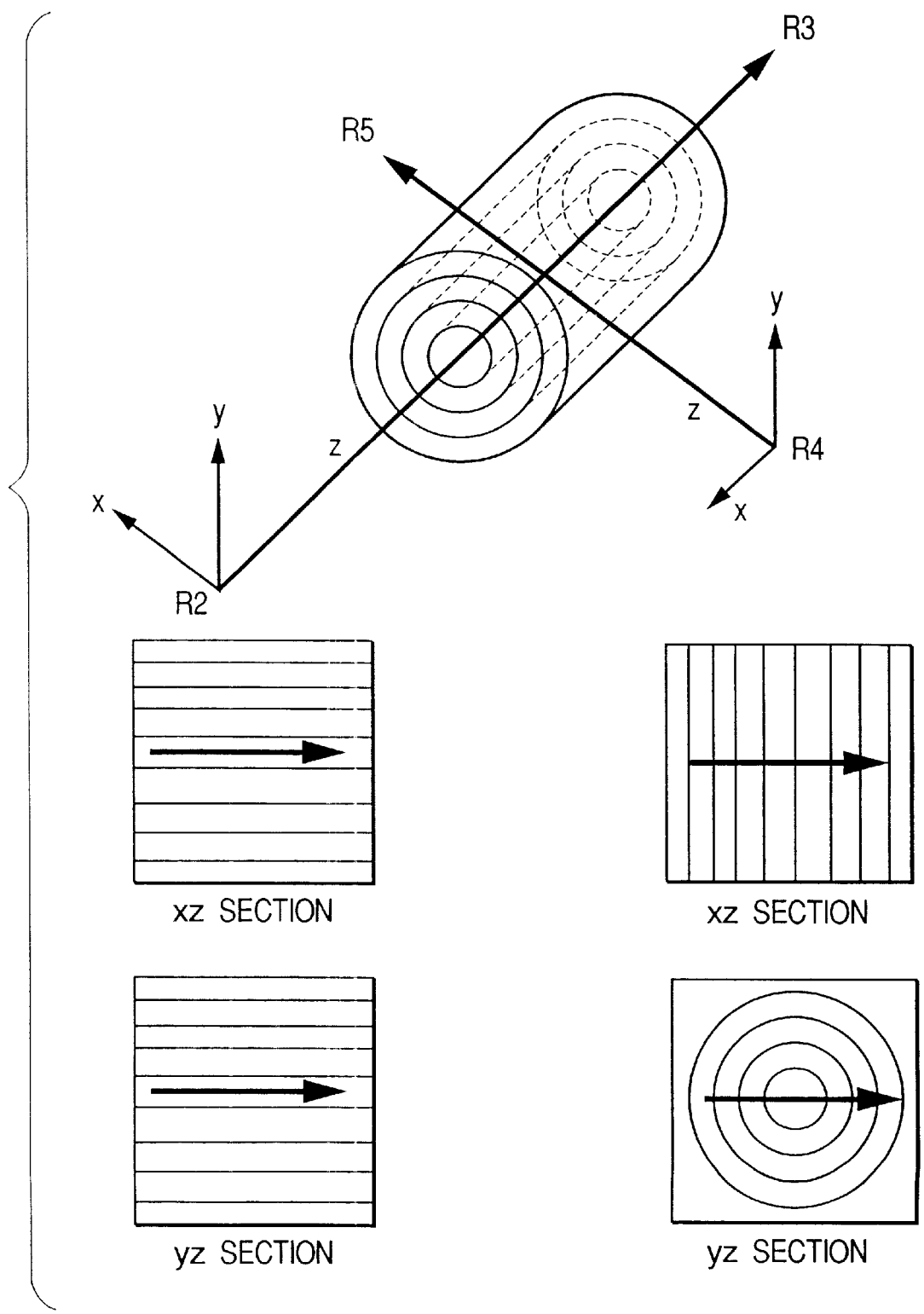
FIG. 10 is a view showing how a light beam travels and the influence of a refractive index distribution on it in FIG. 9.

In this embodiment, a refractive index distribution is formed in the vicinity of the incident refracting surface. The distribution is a so-called radial distribution when viewed from the incident side. In this embodiment, the reference axes cross in the space having the refractive index distribution. As shown in FIG. 10, when a light beam travels from a surface R2 to a surface R3, both the x-z and y-z sections have a radial distribution. However, when the light beam are reflected by the reflecting surfaces R3 and R4 and travels from the reflecting surface R4 to a reflecting surface R5, i.e., the light beam passes through the space having the refractive index distribution again, the x-z section has a distribution like an axial distribution, and the y-z section has a spherical distribution. In this way, the refractive index distribution shape can be made rotationally asymmetric (anamorphic), so the GRIN portion can partially bear correction of decentering aberration generated on the off-axial surface.

That is, since one space can be given different refractive index distributions in accordance with the route the light beam passes, this arrangement is advantageous in aberration correction and size reduction.

The numerical data of this embodiment are as follows.

| [Fifth Embodiment] | | | | | | |
|---|---|---|---|---|---|---|
| Horizontal half field angle | | | | 9.8 | | |
| Vertical half field angle | | | | 7.4 | | |
| Stop diameter | | | | 3.00 | | |
| i | Yi | Zi | θi | Di | Ndi | vdi |
| 1 | 0.00 | 0.00 | 0.00 | 1.79 | 1 | stop |
| 2 | 0.00 | 1.79 | 0.00 | 7.40 | GRIN | refracting surface |
| 3 | 0.00 | 9.19 | 0.00 | 8.00 | 1.51633 | 64.15 refracting surface |
| 4 | 0.00 | 17.19 | 22.50 | 17.00 | 1.51633 | 64.15 reflecting surface |
| 5 | −12.02 | 5.17 | 67.50 | 8.00 | 1.51633 | 64.15 reflecting surface |
| 6 | −4.02 | 5.17 | 90.00 | 7.40 | GRIN | refracting surface |
| 7 | 3.38 | 5.17 | 90.00 | 7.11 | 1 | refracting surface |
| 8 | 10.49 | 5.17 | 90.00 | | 1 | image plane |

Spherical shape
Surface R2 r2=−35.541
Surface R3 r3=∞
Surface R6 r6=∞
Aspherical shape
Surface R4
   C02=−3.89362e-02 C20=−3.81909e-03
   C03=−6.25475e-05 C21=2.09031e-04
   C04=7.71566e-06 C22=−3.01582e-05 C40=−4.85135e-07

Surface R5
   C02=3.12272e-02 C20=8.23150e-03
   C03=−7.08086e-05 C21=−6.54717e-07
   C04=2.86858e-05 C22=1.52445e-05 C40=−3.55021e-06
Surface R7
   C02=4.00448e-02 C20=−1.34959e-02
   C03=−1.31429e-04 C21=1.22550e-03
   C04=−9.24597e-04 C22=−1.90278e-04 C40=−7.62647e-05

Refractive index distribution shape and distribution coefficient

| Radial type | | | | |
|---|---|---|---|---|
| | c-line | d-line | f-line | g-line |
| n0 | 1.523859 | 1.524437 | 1.521749 | 1.519671 |
| sqrt(A) | −0.2199E-04 | −0.4422E-04 | −0.9824E-04 | −0.1408E-03 |

Figure 11:
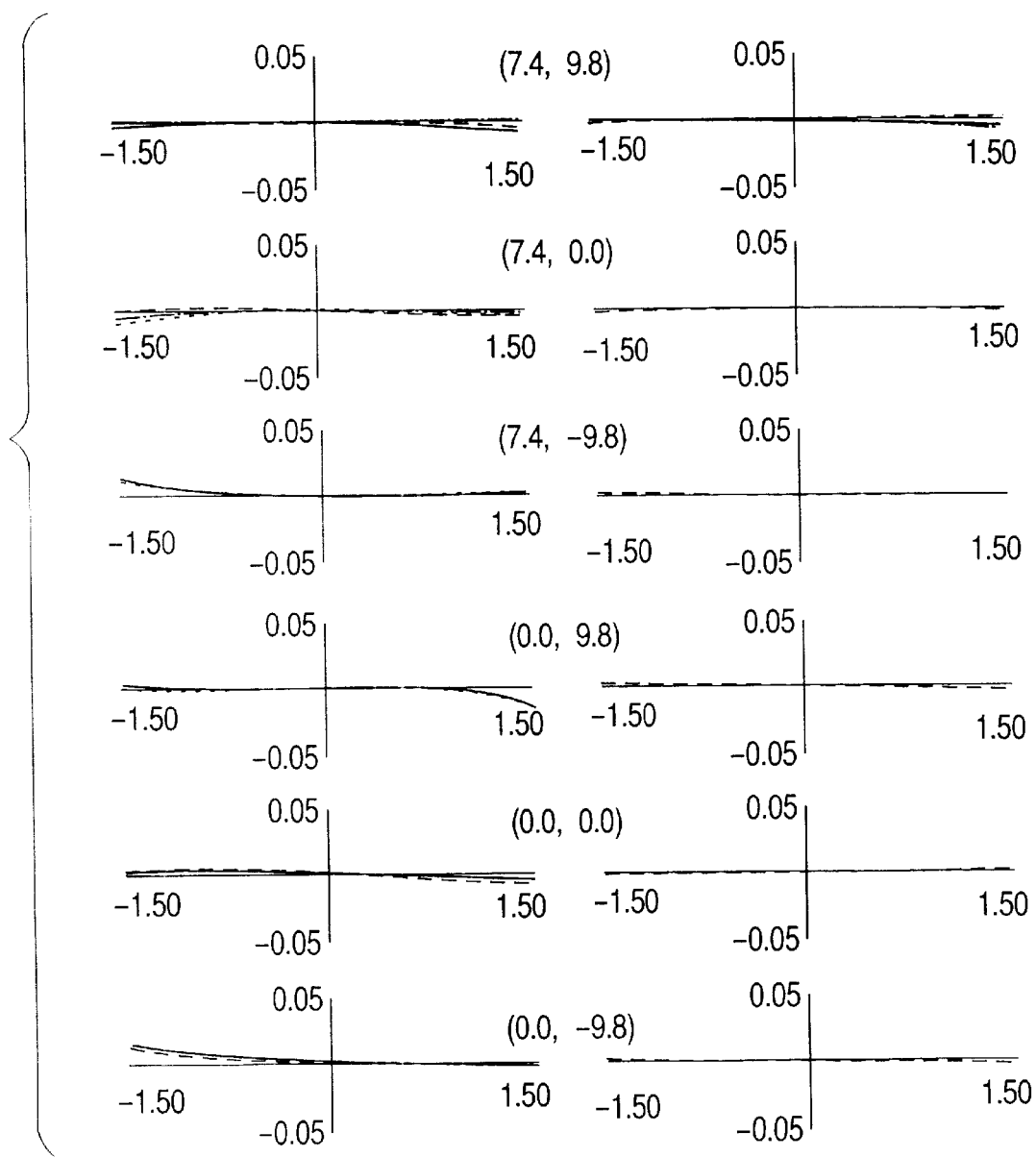
FIG. 11 is a view showing the transverse aberration in the fifth embodiment.

FIG. 11 is a view showing the transverse aberration of the optical system of this embodiment. Referring to FIG. 11, the dotted line indicates the c-line; the solid line, the d-line; the alternate long and short dashed line, the f-line; and the broken line, the g-line. As shown in FIG. 11, well balanced aberration correction is obtained in this embodiment.

According to the present invention, by setting the various factors in the above-described manner, a reflecting optical system which particularly uses an optical element with a plurality of curved or flat reflecting surfaces, which are integrally formed, to reduce the size of the entire mirror optical system and also relax the arrangement precision (assembly precision) required of reflecting mirrors, which is likely to be high in the mirror optical system, and an image pick-up apparatus using the optical system can be realized.

In an off-axial element, chromatic aberration occurs not on the reflecting surface but only on the incident and exit surfaces. A single GRIN lens can form an achromatic lens. Hence, a great effect for correcting chromatic aberration can be obtained by combining these elements.

In addition, when the off-axial element partially bears power, the power of the GRIN can be decreased. Hence, the necessary refractive index difference Δn can be made small, and a lens system whose aberration is satisfactorily corrected can be realized using a material easy to fabricate.

Furthermore, a medium having a refractive index distribution can be used to obtain different refractive index distributions by changing the route of the light beam.

With the above arrangement, a reflecting optical element whose aberration is satisfactorily corrected, and an optical system (image sensing apparatus) can be realized.

What is claimed is:
1. An image pickup apparatus, comprising:
   an image pickup optical system, comprising:
     an optical unit having an optical power, said optical unit comprising:
       a transparent member;
       a light incident surface from which light enters into said transparent member;
       a plurality of internal light reflecting surfaces each having a curvature for successively reflecting the light entered into said transparent member from said light incident surface; and
       a light exit surface from which the light reflected by said plurality of light reflecting surfaces emerges out of said transparent member, wherein at least a portion of said optical unit has a gradual refractive index distribution; and an image pickup element for receiving an image formed by said image pickup optical system.

2. An apparatus according to claim 1, wherein the refractive index distribution is a radial type distribution in which a refractive index changes in a direction perpendicular to a reference axis of the light.

3. An apparatus according to claim 1, wherein the refractive index distribution is an axial type distribution in which a refractive index changes along a reference axis of the light.

4. An apparatus according to claim 1, wherein the refractive index distribution is a spherical type distribution in which a refractive index changes about one point on a reference axis of the light.

5. An apparatus according to claim 4, wherein the spherical type distribution has a center of curvature at the point.

6. An apparatus according to claim 1, wherein reference axes of the light cross in said optical unit.

7. An apparatus according to claim 6, wherein the refractive index distribution is formed at a portion where the reference axes cross.

8. An apparatus according to claim 1, wherein said transparent member of said optical unit comprises a first transparent member having a uniform refractive index distribution and a second transparent member having a gradual refractive index distribution and adhered to the first transparent member.

* * * * *

UNITED STATES PATENT AND TRADEMARK OFFICE
CERTIFICATE OF CORRECTION

PATENT NO. : 6,278,553 B1
DATED : August 21, 2001
INVENTOR(S) : Takeshi Akiyama

It is certified that error appears in the above-identified patent and that said Letters Patent is hereby corrected as shown below:

Column 3,
Line 21, "focal-plane" should read -- focal plane --.

Column 5,
Line 7, "crack" should read -- cracking --.

Column 6,
Line 33, "made of uniform medium and" should be deleted.

Column 13,
Line 11, "6.00" should read -- 0.00 (the Yi value for i=2) --; and
Line 51, "vicinity" should read -- vicinity of --.

Column 16,
Line 19, "f-line," should read -- f-line; --.

Signed and Sealed this

Nineteenth Day of March, 2002

Attest:

JAMES E. ROGAN
Attesting Officer
Director of the United States Patent and Trademark Office